United States Patent
Yang et al.

(10) Patent No.: US 12,356,411 B2
(45) Date of Patent: *Jul. 8, 2025

(54) METHOD AND APPARATUS FOR TRANSMITTING AND RECEIVING WIRELESS SIGNAL IN WIRELESS COMMUNICATION SYSTEM

(71) Applicant: LG Electronics Inc., Seoul (KR)

(72) Inventors: Suckchel Yang, Seoul (KR); Joonkui Ahn, Seoul (KR); Seonwook Kim, Seoul (KR); Changhwan Park, Seoul (KR); Seokmin Shin, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/444,070

(22) Filed: Feb. 16, 2024

(65) Prior Publication Data
US 2024/0236998 A1    Jul. 11, 2024

Related U.S. Application Data

(63) Continuation of application No. 17/431,043, filed as application No. PCT/KR2020/002270 on Feb. 17, 2020, now Pat. No. 11,943,775.

(30) Foreign Application Priority Data

Feb. 15, 2019  (KR) .................. 10-2019-0017610
Oct. 4, 2019   (KR) .................. 10-2019-0123395

(51) Int. Cl.
H04W 72/21       (2023.01)
H04L 27/26       (2006.01)
(Continued)

(52) U.S. Cl.
CPC ......... *H04W 72/21* (2023.01); *H04L 27/2607* (2013.01); *H04W 72/0453* (2013.01); *H04W 74/0816* (2013.01)

(58) Field of Classification Search
CPC ............. H04W 72/21; H04W 72/0453; H04W 74/0816; H04L 27/2607
See application file for complete search history.

(56) References Cited

U.S. PATENT DOCUMENTS 10,863,508 B1 *  12/2020  Sun ................. H04L 5/0091
2017/0237592 A1 *  8/2017  Yang .................. H04W 72/21
                                                    375/260
(Continued)

FOREIGN PATENT DOCUMENTS

EP        3618328 B1 *   9/2022   ........... H04L 1/0013
WO  WO-2017126936 A1 *   7/2017   ........ H04W 72/0446
(Continued)

*Primary Examiner* — Kenny S Lin
(74) *Attorney, Agent, or Firm* — Fish & Richardson P.C.

(57) ABSTRACT

The present invention relates to a wireless communication system, specifically to a method and an apparatus therefore, the method comprising the steps of: receiving resource allocation (RA) information for transmitting a PUSCH in a frequency band, the frequency band comprising a plurality of sub-bands (SB), each SB comprising a plurality of consecutive RBs, a guard band (GB) being provided between the plurality of SBs, and the RA information indicating one or more non-consecutive SB indexes; and transmitting the PUSCH in an RB interlace in the frequency band on the basis of the RA information.

18 Claims, 21 Drawing Sheets

(a) Alt 1-1 resource allocation (b) Alt 1-2 resource allocation

(51) Int. Cl.
*H04W 72/0453* (2023.01)
*H04W 74/0816* (2024.01)

(56) References Cited

U.S. PATENT DOCUMENTS

| | | | | |
|---|---|---|---|---|
| 2017/0273056 | A1* | 9/2017 | Papasakellariou | H04W 52/143 |
| 2018/0048422 | A1* | 2/2018 | Park | H04W 74/002 |
| 2018/0131547 | A1* | 5/2018 | Wang | H04L 27/2602 |
| 2019/0190668 | A1* | 6/2019 | Lei | H04L 5/001 |
| 2022/0053536 | A1* | 2/2022 | Lei | H04W 72/20 |
| 2022/0104258 | A1* | 3/2022 | Moon | H04W 72/044 |
| 2022/0287035 | A1* | 9/2022 | Yang | H04L 5/001 |

FOREIGN PATENT DOCUMENTS

| | | | | |
|---|---|---|---|---|
| WO | WO-2017195626 | A1 * | 11/2017 | H04W 72/04 |
| WO | WO-2019216910 | A1 * | 11/2019 | |
| WO | WO-2020030263 | A1 * | 2/2020 | H04L 5/0041 |

* cited by examiner (a) Carrier aggregation between L-band and U-band (b) Standalone U-band(s)

RB Interlace #1 [RB #(4n+1) (n=0, 1, ...)]
RB Interlace is defined per BWP

RB Interlace #1     RB Interlace #0
RB Interlace is defined per LBT-SB (= RB set)

(a) Alt 1-1 resource allocation (b) Alt 1-2 resource allocation (a) Alt 2-1 resource allocation (b) Alt 2-2 resource allocation RA information for PUSCH : {Interlace #2, SB #1} => Intersection of interlace #1 and SB #1

(a) Case 1: one SB index is indicated via RA information for PUSCH

RA information for PUSCH : {Interlace #2, SB #1/#2} => Intersection of interlace #1 and SB #1/#2/GB#1

(b) Case 2: consecutive SB indexes are indicated via RA information for PUSCH

METHOD AND APPARATUS FOR TRANSMITTING AND RECEIVING WIRELESS SIGNAL IN WIRELESS COMMUNICATION SYSTEM

CROSS-REFERENCE TO RELATED APPLICATIONS

This application is a continuation of U.S. application Ser. No. 17/431,043, filed on Aug. 13, 2021, which is a National Stage application under 35 U.S.C. § 371 of International Application No. PCT/KR2020/002270, filed on Feb. 17, 2020, which claims the benefit of Korean Application Nos. 10-2019-0123395, filed on Oct. 4, 2019, and 10-2019-0017610, filed on Feb. 15, 2019. The disclosures of the prior applications are incorporated by reference in their entirety.

TECHNICAL FIELD

The present disclosure relates to a wireless communication system, and more particularly, to a method and apparatus for transmitting and receiving a wireless signal.

BACKGROUND

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

SUMMARY

Provided are a method and apparatus for efficiently performing a wireless signal transmission and reception process.

It will be appreciated by persons skilled in the art that the objects that could be achieved with the present disclosure are not limited to what has been particularly described hereinabove and the above and other objects that the present disclosure could achieve will be more clearly understood from the following detailed description.

According to an aspect of the present disclosure, a method of performing an uplink transmission by a user equipment (UE) in a wireless communication system includes receiving resource allocation (RA) information for a physical uplink shared channel (PUSCH) transmission in a frequency band, wherein the frequency band includes a plurality of subbands (SBs), each SB including a plurality of consecutive resource blocks (RBs), a guard band (GB) is included between the plurality of SBs, and the RA information indicates at least one consecutive SB index, and performing the PUSCH transmission in an RB interlace within the frequency band based on the RA information. Based on the RA information indicating only one SB index, the PUSCH transmission is performed only in the RB interlace of an indicated SB. Based on the RA information indicating a plurality of SB indexes, the PUSCH transmission is performed in the RB interlace in (i) a plurality of indicated SBs and (ii) at least one GB between the plurality of indicated SBs.

According to another aspect of the present disclosure, a UE used in a wireless communication system includes at least one processor, and at least one computer memory operatively coupled to the at least one processor and when executed, causing the at least one processor to perform an operation. The operation includes receiving RA information for a PUSCH transmission in a frequency band, wherein the frequency band includes a plurality of SBs, each SB including a plurality of consecutive RBs, a GB is included between the plurality of SBs, and the RA information indicates at least one consecutive SB index, and performing the PUSCH transmission in an RB interlace within the frequency band based on the RA information. Based on the RA information indicating only one SB index, the PUSCH transmission is performed only in the RB interlace of an indicated SB. Based on the RA information indicating a plurality of SB indexes, the PUSCH transmission is performed in the RB interlace in (i) a plurality of indicated SBs and (ii) at least one GB between the plurality of indicated SBs.

According to a third aspect of the present disclosure, an apparatus for a UE includes at least one processor, and at least one computer memory operatively coupled to the at least one processor and when executed, causing the at least one processor to perform an operation. The operation includes receiving RA information for a PUSCH transmission in a frequency band, wherein the frequency band includes a plurality of SBs, each SB including a plurality of consecutive RBs, a GB is included between the plurality of SBs, and the RA information indicates at least one consecutive SB index, and performing the PUSCH transmission in an RB interlace within the frequency band based on the RA information. Based on the RA information indicating only one SB index, the PUSCH transmission is performed only in the RB interlace of an indicated SB. Based on the RA information indicating a plurality of SB indexes, the PUSCH transmission is performed in the RB interlace in (i) a plurality of indicated SBs and (ii) at least one GB between the plurality of indicated SBs.

According to a fourth aspect of the present disclosure, a computer-readable storage medium includes at least one computer program when executed, causes at least one processor to perform an operation. The operation includes receiving RA information for a PUSCH transmission in a frequency band, wherein the frequency band includes a plurality of SBs, each SB including a plurality of consecutive RBs, a GB is included between the plurality of SBs, and the RA information indicates at least one consecutive SB index, and performing the PUSCH transmission in an RB interlace within the frequency band based on the RA information. Based on the RA information indicating only one SB index, the PUSCH transmission is performed only in the RB interlace of an indicated SB. Based on the RA information indicating a plurality of SB indexes, the PUSCH transmission is performed in the RB interlace in (i) a plurality of indicated SBs and (ii) at least one GB between the plurality of indicated SBs.

According to a fifth aspect of the present disclosure, a method of receiving an uplink transmission by a base station (BS) in a wireless communication system includes transmitting RA information for a PUSCH reception in a frequency band, wherein the frequency band includes a plurality of SBs, each SB including a plurality of consecutive RBs, a GB is included between the plurality of SBs, and the RA information indicates at least one consecutive SB index, and performing the PUSCH reception in an RB interlace within the frequency band based on the RA information. Based on the RA information indicating only one SB index, the PUSCH reception is performed only in the RB interlace of an indicated SB. Based on the RA information indicating a plurality of SB indexes, the PUSCH reception is performed in the RB interlace in (i) a plurality of indicated SBs and (ii) at least one GB between the plurality of indicated SBs.

According to a sixth aspect of the present disclosure, a BS used in a wireless communication system includes at least one processor, and at least one computer memory operatively coupled to the at least one processor and when executed, causing the at least one processor to perform an operation. The operation includes transmitting RA information for a PUSCH reception in a frequency band, wherein the frequency band includes a plurality of SBs, each SB including a plurality of consecutive RBs, a GB is included between the plurality of SBs, and the RA information indicates at least one consecutive SB index, and performing the PUSCH reception in an RB interlace within the frequency band based on the RA information. Based on the RA information indicating only one SB index, the PUSCH reception is performed only in the RB interlace of an indicated SB. Based on the RA information indicating a plurality of SB indexes, the PUSCH reception is performed in the RB interlace in (i) a plurality of indicated SBs and (ii) at least one GB between the plurality of indicated SBs.

Each GB may include at least one consecutive RB.

The RB interlace may include RB groups (RBGs) spaced from each other by an equal distance in the frequency band, and each RBG may include at least one consecutive RB.

The frequency band may include an unlicensed band.

The RA information may be received or transmitted on a physical downlink shared channel (PDCCH).

According to the present disclosure, a wireless signal may be efficiently transmitted and received in a wireless communication system.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BRIEF DESCRIPTION OF THE DRAWINGS

The accompanying drawings, which are included to provide a further understanding of the disclosure, illustrate embodiments of the present disclosure and together with the description serve to explain the principle of the present disclosure.

DETAILED DESCRIPTION

The following technology may be used in various wireless access systems such as code division multiple access (CDMA), frequency division multiple access (FDMA), time division multiple access (TDMA), orthogonal frequency division multiple access (OFDMA), single carrier frequency division multiple access (SC-FDMA), and so on. CDMA may be implemented as a radio technology such as universal terrestrial radio access (UTRA) or CDMA2000. TDMA may be implemented as a radio technology such as global system for mobile communications (GSM)/general packet radio service (GPRS)/enhanced data rates for GSM evolution (EDGE). OFDMA may be implemented as a radio technology such as institute of electrical and electronics engineers (IEEE) 802.11 (wireless fidelity (Wi-Fi)), IEEE 802.16 (worldwide interoperability for microwave access (WiMAX)), IEEE 802.20, evolved UTRA (E-UTRA), and so on. UTRA is a part of universal mobile telecommunications system (UMTS). 3rd generation partnership project (3GPP) long term evolution (LTE) is a part of evolved UMTS (E-UMTS) using E-UTRA, and LTE-advanced (LTE-A) is an evolution of 3GPP LTE. 3GPP new radio or new radio access technology (NR) is an evolved version of 3GPP LTE/LTE-A.

As more and more communication devices require larger communication capacities, the need for enhanced mobile broadband communication relative to the legacy radio access technologies (RATs) has emerged. Massive machine type communication (MTC) providing various services to inter-connected multiple devices and things at any time in any place is one of significant issues to be addressed for next-generation communication. A communication system design in which services sensitive to reliability and latency are considered is under discussion as well. As such, the introduction of the next-generation radio access technology (RAT) for enhanced mobile broadband communication (eMBB), massive MTC (mMTC), and ultra-reliable and low latency communication (URLLC) is being discussed. For convenience, this technology is called NR or New RAT in the present disclosure.

While the following description is given in the context of a 3GPP communication system (e.g., NR) for clarity, the technical spirit of the present disclosure is not limited to the 3GPP communication system.

In a wireless access system, a user equipment (UE) receives information from a base station (BS) on DL and transmits information to the BS on UL. The information transmitted and received between the UE and the BS includes general data and various types of control information. There are many physical channels according to the types/usages of information transmitted and received between the BS and the UE.

Figure 1:
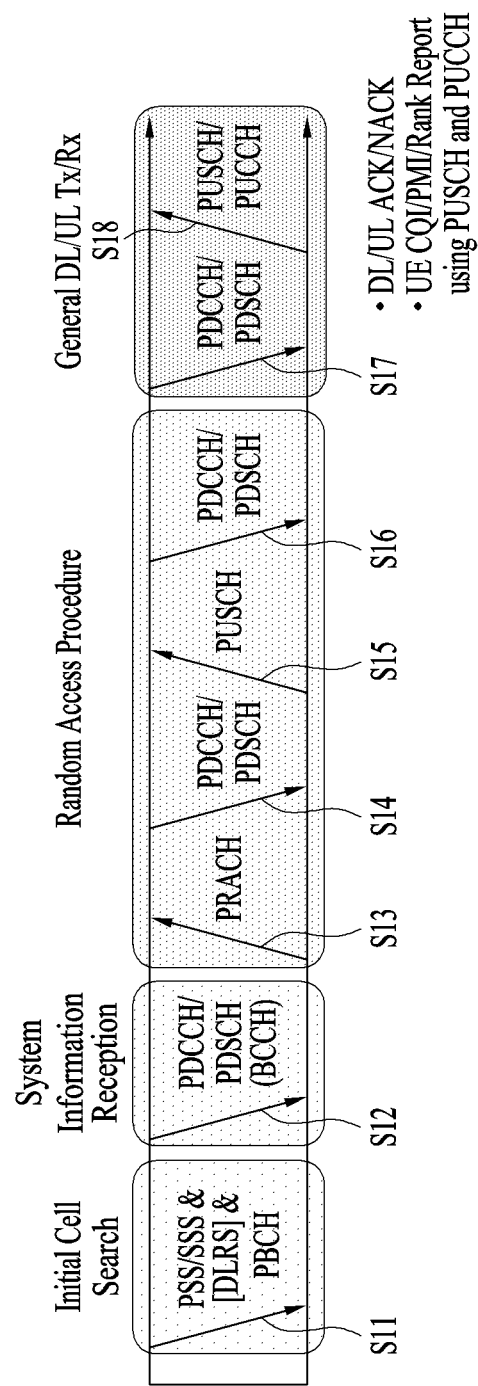
FIG. 1 illustrates physical channels and a general signal transmission method using the physical channels in a 3rd generation partnership project (3GPP) system as an exemplary wireless communication system.

FIG. 1 illustrates physical channels and a general signal transmission method using the physical channels in a 3GPP system.

When a UE is powered on or enters a new cell, the UE performs initial cell search (S101). The initial cell search involves acquisition of synchronization to a BS. For this purpose, the UE receives a synchronization signal block (SSB) from the BS. The SSB includes a primary synchronization signal (PSS), a secondary synchronization signal (SSS), and a physical broadcast channel (PBCH). The UE synchronizes its timing to the BS and acquires information such as a cell identifier (ID) based on the PSS/SSS. Further, the UE may acquire information broadcast in the cell by receiving the PBCH from the BS. During the initial cell search, the UE may also monitor a DL channel state by receiving a downlink reference signal (DL RS).

Subsequently, to complete connection to the BS, the UE may perform a random access procedure with the BS (S103 to S106). Specifically, the UE may transmit a preamble on a physical random access channel (PRACH) (S103) and may receive a PDCCH and a random access response (RAR) for the preamble on a PDSCH corresponding to the PDCCH (S104). The UE may then transmit a physical uplink shared channel (PUSCH) by using scheduling information in the RAR (S105), and perform a contention resolution procedure including reception of a PDCCH and a PDSCH signal corresponding to the PDCCH (S106).

After the above procedure, the UE may receive a PDCCH and/or a PDSCH from the BS (S107) and transmit a physical uplink shared channel (PUSCH) and/or a physical uplink control channel (PUCCH) to the BS (S108), in a general UL/DL signal transmission procedure. Control information that the UE transmits to the BS is generically called uplink control information (UCI). The UCI includes a hybrid automatic repeat and request acknowledgement/negative acknowledgement (HARQ-ACK/NACK), a scheduling request (SR), channel state information (CSI), and so on. The CSI includes a channel quality indicator (CQI), a precoding matrix index (PMI), a rank indication (RI), and so on. In general, UCI is transmitted on a PUCCH. However, if control information and data should be transmitted simultaneously, the control information and the data may be transmitted on a PUSCH. In addition, the UE may transmit the UCI aperiodically on the PUSCH, upon receipt of a request/command from a network.

Figure 2:
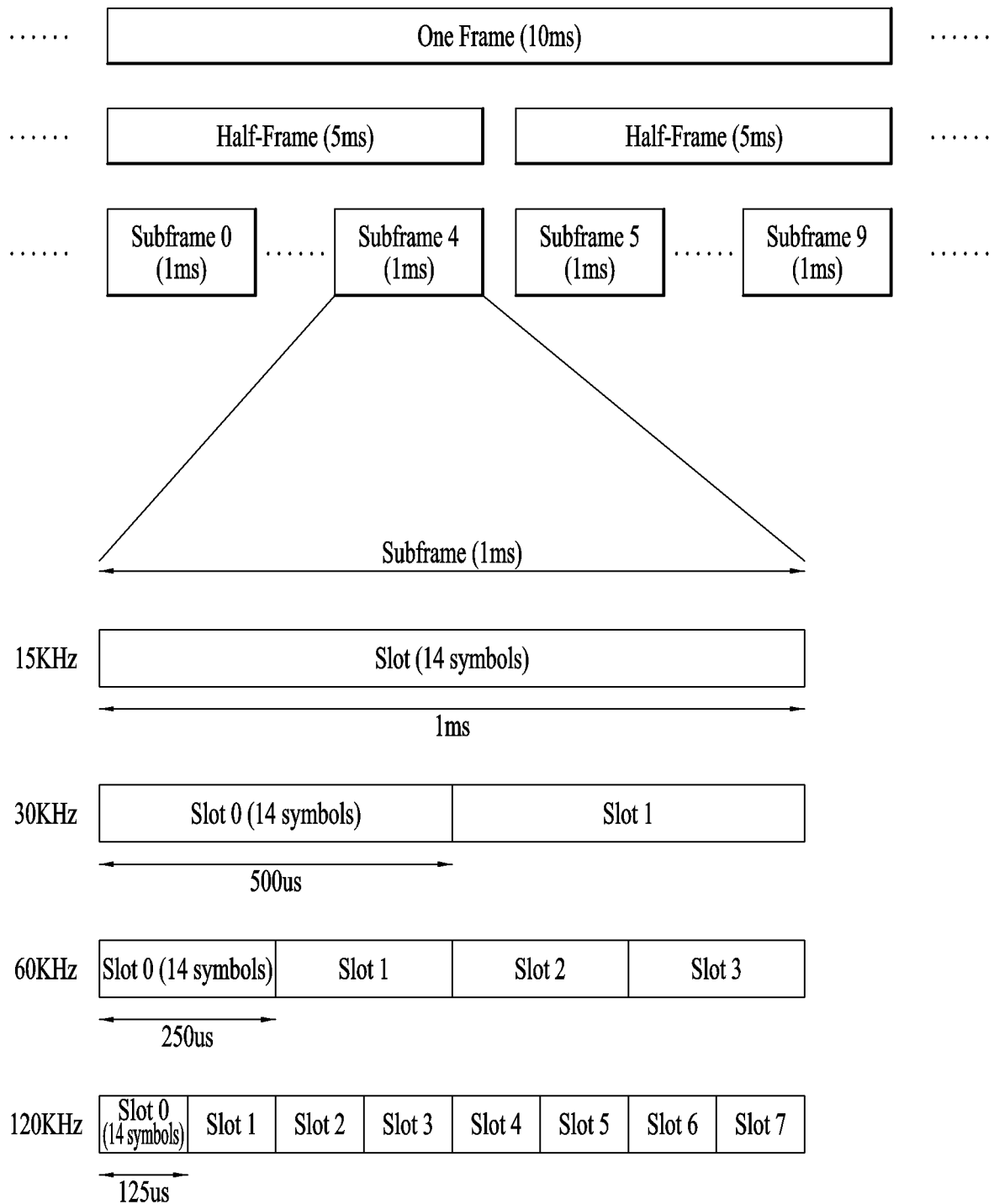
FIG. 2 illustrates a radio frame structure.

FIG. 2 illustrates a radio frame structure.

In NR, UL and DL transmissions are configured in frames. Each radio frame has a length of 10 ms and is divided into two 5-ms half-frames. Each half-frame is divided into five 1-ms subframes. A subframe is divided into one or more slots, and the number of slots in a subframe depends on a subcarrier spacing (SCS). Each slot includes 12 or 14 OFDM(A) symbols according to a cyclic prefix (CP). When a normal CP is used, each slot includes 14 OFDM symbols. When an extended CP is used, each slot includes 12 OFDM symbols. A symbol may include an OFDM symbol (or a CP-OFDM symbol) and an SC-FDMA symbol (or a discrete Fourier transform-spread-OFDM (DFT-s-OFDM) symbol).

Table 1 exemplarily illustrates that the number of symbols per slot, the number of slots per frame, and the number of slots per subframe vary according to SCSs in a normal CP case.

TABLE 1

| SCS (15 * 2^u) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

* $N^{slot}_{symb}$: number of symbols in a slot
* $N^{frame,u}_{slot}$: number of slots in a frame
* $N^{subframe,u}_{slot}$: number of slots in a subframe Table 2 illustrates that the number of symbols per slot, the number of slots per frame, and the number of slots per subframe vary according to SCSs in an extended CP case.

TABLE 2

| SCS (15 * 2^u) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

The frame structure is merely an example, and the number of subframes, the number of slots, and the number of symbols in a frame may be changed in various manners.

In the NR system, different OFDM(A) numerologies (e.g., SCSs, CP lengths, and so on) may be configured for a plurality of cells aggregated for one UE. Accordingly, the (absolute time) duration of a time resource (e.g., a subframe, a slot, or a transmission time interval (TTI)) (for convenience, referred to as a time unit (TU)) composed of the same number of symbols may be configured differently between the aggregated cells. A symbol may include an OFDM symbol (or a CP-OFDM symbol) and an SC-FDMA symbol (or a discrete Fourier transform-spread-OFDM (DFT-s-OFDM) symbol).

NR may support various numerologies (or subcarrier spacings (SCSs)) to provide various 5G services. For example, NR may support a wide area in conventional cellular bands in an SCS of 15 kHz and support a dense urban area and a wide carrier bandwidth with lower latency in an SCS of 30/60 kHz. In an SCS of 60 kHz or above, NR may support a bandwidth higher than 24.25 GHz to overcome phase noise.

NR frequency bands may be divided into two frequency ranges: frequency range 1 (FR1) and frequency range 2 (FR2). FR1 and FR2 may be configured as shown in Table 3 below. FR 2 may mean a millimeter wave (mmW).

TABLE 3

| Frequency Range designation | Corresponding frequency range | Subcarrier Spacing |
|---|---|---|
| FR1 | 450 MHz-7125 MHz | 15, 30, 60 kHz |
| FR2 | 24250 MHz-52600 MHz | 60, 120, 240 kHz |

Figure 3:
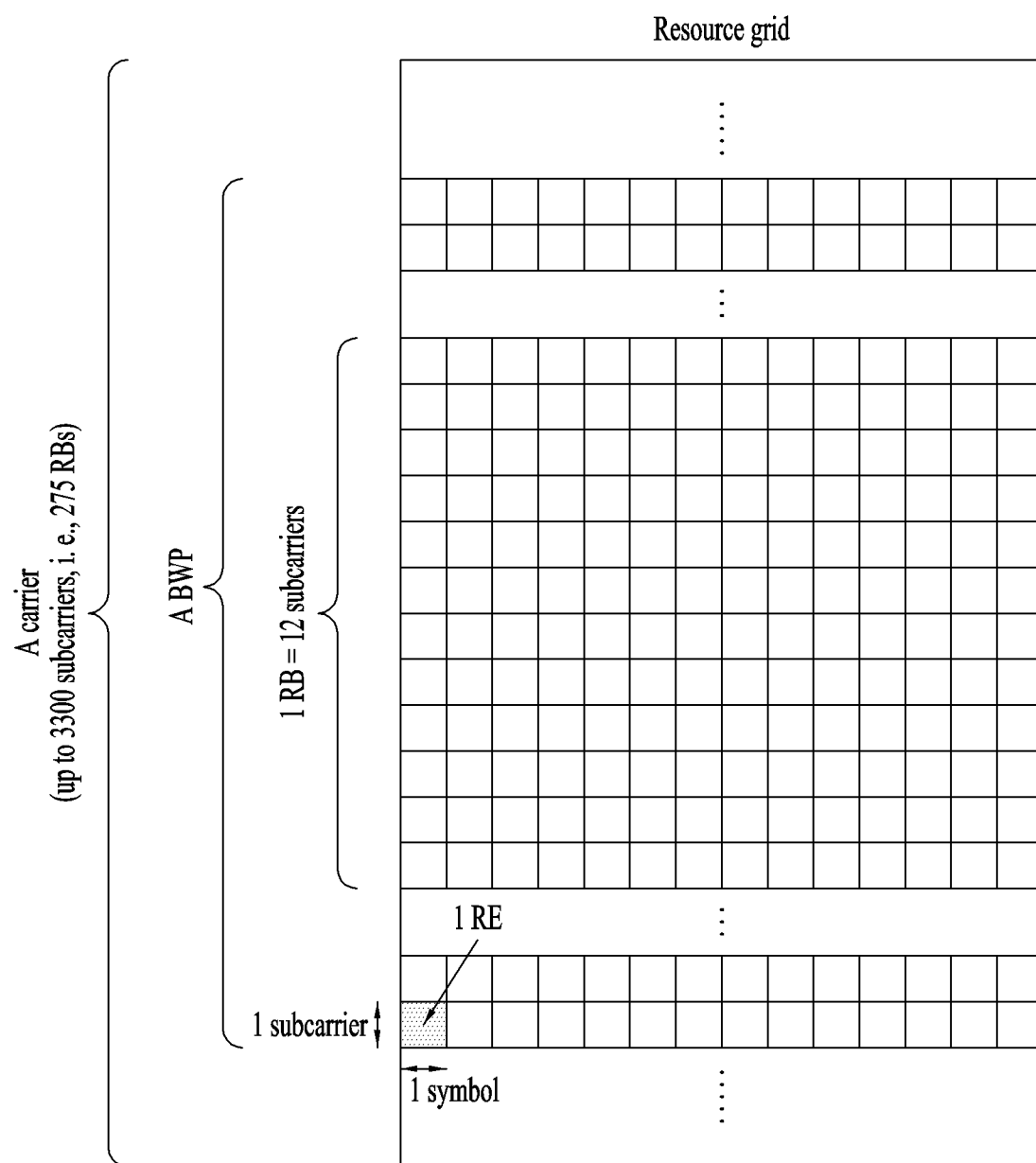
FIG. 3 illustrates a resource grid of a slot.

FIG. 3 illustrates a resource grid during the duration of one slot. A slot includes a plurality of symbols in the time domain. For example, one slot includes 14 symbols in a normal CP case and 12 symbols in an extended CP case. A carrier includes a plurality of subcarriers in the frequency domain. A resource block (RB) may be defined by a plurality of (e.g., 12) consecutive subcarriers in the frequency domain. A bandwidth part (BWP) may be defined by a plurality of consecutive (physical) RBs ((P)RBs) in the frequency domain and correspond to one numerology (e.g., SCS, CP length, and so on). A carrier may include up to N (e.g., 5) BWPs.

Data communication may be conducted in an active BWP, and only one BWP may be activated for one UE. Each element in a resource grid may be referred to as a resource element (RE), to which one complex symbol may be mapped.

Figure 4:
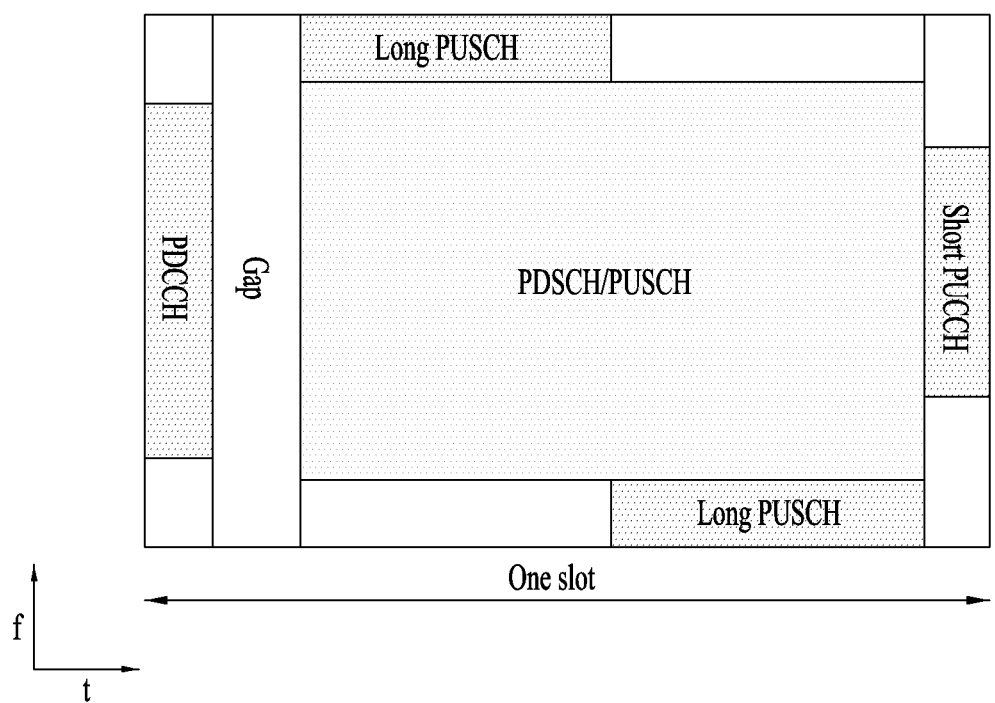
FIG. 4 illustrates mapping of physical channels in a slot.

FIG. 4 illustrates a structure of a slot. In the NR system, a frame has a self-contained structure in which a DL control channel, DL or UL data, a UL control channel, and the like may all be contained in one slot. For example, the first N symbols (hereinafter, DL control region) in the slot may be used to transmit a DL control channel (e.g., PDCCH), and the last M symbols (hereinafter, UL control region) in the slot may be used to transmit a UL control channel (e.g., PUCCH). N and M are integers greater than or equal to 0. A resource region (hereinafter, a data region) that is between the DL control region and the UL control region may be used for DL data (e.g., PDSCH) transmission or UL data (e.g., PUSCH) transmission. The GP provides a time gap for the BS and UE to transition from the transmission mode to the reception mode or from the reception mode to the transmission mode. Some symbols at the time of DL-to-UL switching in a subframe may be configured as the GP.

The PDCCH delivers DCI. For example, the PDCCH (i.e., DCI) may carry information about a transport format and resource allocation of a DL shared channel (DL-SCH), resource allocation information of an uplink shared channel (UL-SCH), paging information on a paging channel (PCH), system information on the DL-SCH, information on resource allocation of a higher-layer control message such as an RAR transmitted on a PDSCH, a transmit power control command, information about activation/release of configured scheduling, and so on. The DCI includes a cyclic redundancy check (CRC). The CRC is masked with various identifiers (IDs) (e.g. a radio network temporary identifier (RNTI)) according to an owner or usage of the PDCCH. For example, if the PDCCH is for a specific UE, the CRC is masked by a UE ID (e.g., cell-RNTI (C-RNTI)). If the PDCCH is for a paging message, the CRC is masked by a paging-RNTI (P-RNTI). If the PDCCH is for system information (e.g., a system information block (SIB)), the CRC is masked by a system information RNTI (SI-RNTI). When the PDCCH is for an RAR, the CRC is masked by a random access-RNTI (RA-RNTI).

The PUCCH delivers uplink control information (UCI). The UCI includes the following information.

SR: information used to request UL-SCH resources.

HARQ-ACK: a response to a DL data packet (e.g., codeword) on the PDSCH. An HARQ-ACK indicates whether the DL data packet has been successfully received. In response to a single codeword, a 1-bit of HARQ-ACK may be transmitted. In response to two codewords, a 2-bit HARQ-ACK may be transmitted. The HARQ-ACK response includes positive ACK (simply, ACK), negative ACK (NACK), discontinuous transmission (DTX) or NACK/DTX. The term "HARQ-ACK" is interchangeably used with HARQ ACK/NACK and ACK/NACK.

CSI: feedback information for a DL channel. Multiple input multiple output (MIMO)-related feedback information includes an RI and a PMI.

Table 4 illustrates exemplary PUCCH formats. PUCCH formats may be divided into short PUCCHs (Formats 0 and 2) and long PUCCHs (Formats 1, 3, and 4) based on PUCCH transmission durations.

TABLE 4

| PUCCH format | Length in OFDM symbols $N_{symb}^{PUCCH}$ | Number of bits | Usage | Etc |
|---|---|---|---|---|
| 0 | 1-2 | ≤2 | HARQ, SR | Sequence selection |
| 1 | 4-14 | ≤2 | HARQ, [SR] | Sequence modulation |
| 2 | 1-2 | >2 | HARQ, CSI, [SR] | CP-OFDM |
| 3 | 4-14 | >2 | HARQ, CSI, [SR] | DFT-s-OFDM (no UE multiplexing) |
| 4 | 4-14 | >2 | HARQ, CSI, [SR] | DFT-s-OFDM (Pre DFT OCC) |

Figure 5:
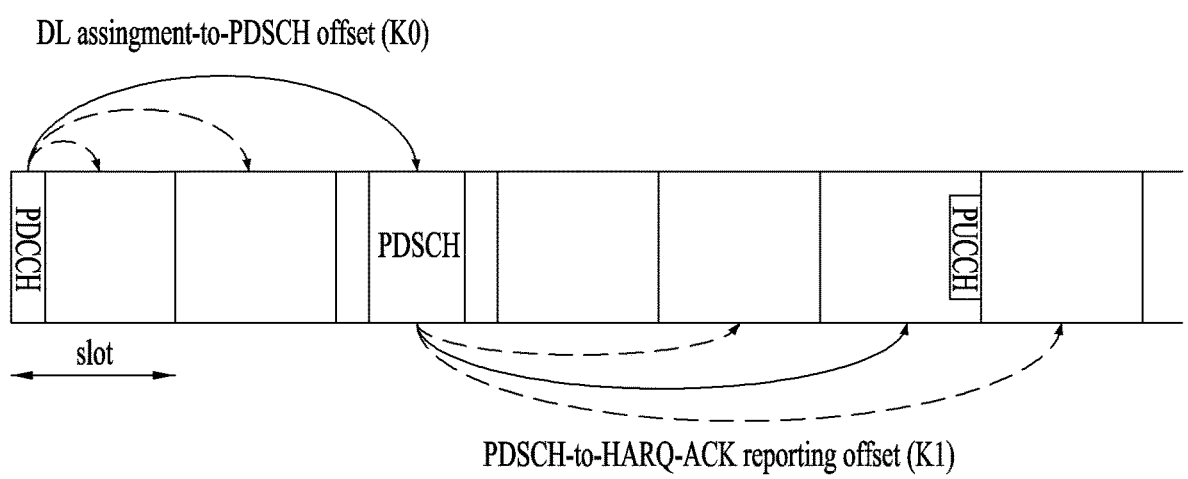
FIG. 5 illustrates an acknowledgment/negative acknowledgment (ACK/NACK) transmission process.

FIG. 5 illustrates an ACK/NACK transmission process. Referring to FIG. 5, the UE may detect a PDCCH in slot #n. The PDCCH includes DL scheduling information (e.g., DCI format 1_0 or DCI format 1_1). The PDCCH indicates a DL assignment-to-PDSCH offset, K0 and a PDSCH-to-HARQ-ACK reporting offset, K1. For example, DCI format 1_0 and DCI format 1_1 may include the following information.

Frequency domain resource assignment: Indicates an RB set assigned to a PDSCH.

Time domain resource assignment: Indicates K0 and the starting position (e.g. OFDM symbol index) and length (e.g. the number of OFDM symbols) of the PDSCH in a slot PDSCH-to-HARQ_feedback timing indicator: Indicates K1.

HARQ process number (4 bits): Indicates the HARQ process ID of data (e.g., a PDSCH or TB).

PUCCH resource indicator (PRI): Indicates PUCCH resource used for UCI transmission among a plurality of PUCCH resources in a PUCCH resource set.

After receiving a PDSCH in slot #(n+K0) according to the scheduling information of slot #n, the UE may transmit UCI on a PUCCH in slot #(n+K1). The UCI includes an HARQ-ACK response to the PDSCH. In the case where the PDSCH is configured to carry one TB at maximum, the HARQ-ACK response may be configured in one bit. In the case where the PDSCH is configured to carry up to two TBs, the HARQ-ACK response may be configured in two bits if spatial bundling is not configured and in one bit if spatial bundling is configured. When slot #(n+K1) is designated as an HARQ-ACK transmission timing for a plurality of PDSCHs, UCI transmitted in slot #(n+K1) includes HARQ-ACK responses to the plurality of PDSCHs.

Figure 6:
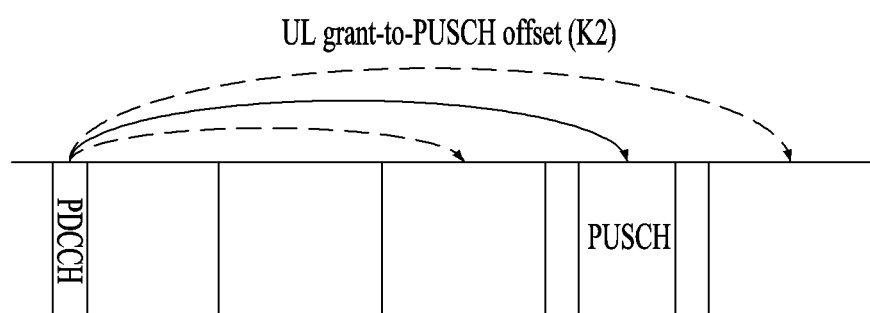
FIG. 6 illustrates a physical uplink shared channel (PUSCH) transmission process.

FIG. 6 illustrates an exemplary PUSCH transmission process. Referring to FIG. 6, the UE may detect a PDCCH in slot #n. The PDCCH may include UL scheduling information (e.g., DCI format 0_0 or DCI format 0_1). DCI format 0_0 and DCI format 0_1 may include the following information.

Frequency domain resource assignment: Indicates an RB set allocated to a PUSCH.

Time domain resource assignment: Specifies a slot offset K2 indicating the starting position (e.g., symbol index) and length (e.g., the number of OFDM symbols) of the PUSCH in a slot. The starting symbol and length of the PUSCH may be indicated by a start and length indicator value (SLIV), or separately.

The UE may then transmit a PUSCH in slot #(n+K2) according to the scheduling information in slot #n. The PUSCH includes a UL-SCH TB. When PUCCH transmission time and PUSCH transmission time overlaps, UCI can be transmitted via PUSCH (PUSCH piggyback).

Figure 7:
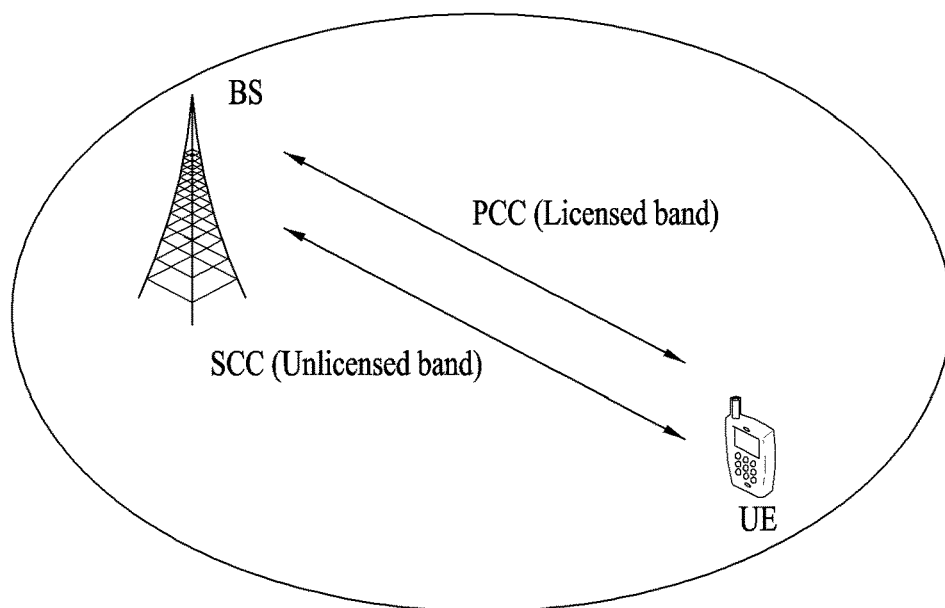
FIG. 7 illustrates an exemplary wireless communication system supporting an unlicensed band
Figure 7:
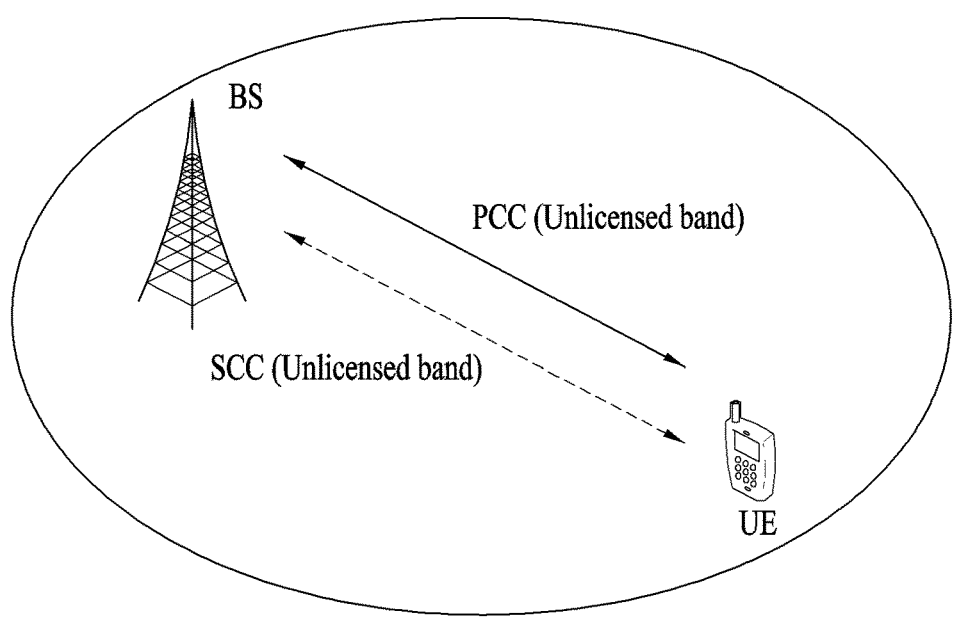

FIG. 7 illustrates an exemplary wireless communication system supporting an unlicensed band applicable to the present disclosure. In the following description, a cell operating in a licensed band (L-band) is defined as an L-cell, and a carrier of the L-cell is defined as a (DL/UL) LCC. A cell operating in an unlicensed band (U-band) is defined as a U-cell, and a carrier of the U-cell is defined as a (DL/UL) UCC. The carrier/carrier-frequency of a cell may refer to the operating frequency (e.g., center frequency) of the cell. A cell/carrier (e.g., CC) is commonly called a cell.

When carrier aggregation is supported, one UE may use a plurality of aggregated cells/carriers to exchange a signal with the BS. When one UE is configured with a plurality of CCs, one CC may be set to a primary CC (PCC), and the remaining CCs may be set to secondary CCs (SCCs). Specific control information/channels (e.g., CSS PDCCH, PUCCH) may be transmitted and received only on the PCC. Data may be transmitted and received on the PCC/SCC. FIG. 7(a) shows a case in which the UE and BS exchange signals on both the LCC and UCC (non-standalone (NSA) mode). In this case, the LCC and UCC may be set to the PCC and SCC, respectively. When the UE is configured with a plurality of LCCs, one specific LCC may be set to the PCC, and the remaining LCCs may be set to the SCC. FIG. 7(a) corresponds to the LAA of the 3GPP LTE system. FIG. 7(b) shows a case in which the UE and BS exchange signals on one or more UCCs with no LCC (standalone (SA) mode). In this case, one of the UCCs may be set to the PCC, and the remaining UCCs may be set to the SCC. Both the NSA mode and SA mode may be supported in the U-band of the 3GPP NR system.

Figure 8:
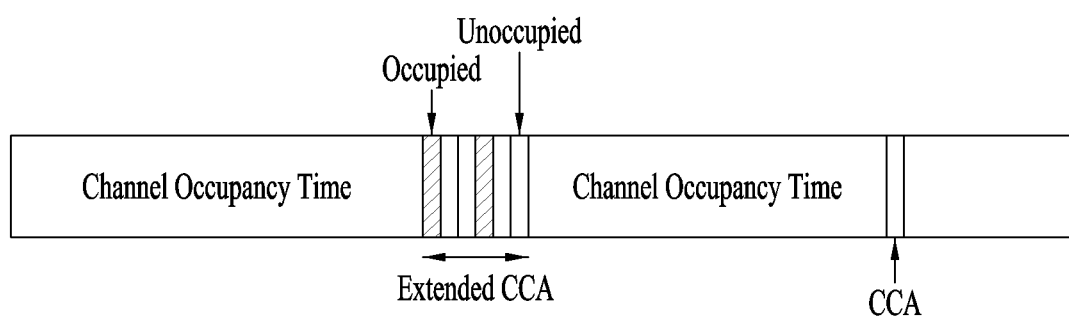
FIG. 8 illustrates an exemplary method of occupying resources in an unlicensed band.

FIG. 8 illustrates an exemplary method of occupying resources in an unlicensed band. According to regional regulations for the U-band, a communication node in the U-band needs to determine whether a corresponding channel is used by other communication node(s) before transmitting a signal. Specifically, the communication node may perform carrier sensing (CS) before transmitting the signal so as to check whether the other communication node(s) perform signal transmission. When the other communication node(s) perform no signal transmission, it is said that clear channel assessment (CCA) is confirmed. When a CCA threshold is predefined or configured by higher layer signaling (e.g., RRC signaling), if the detected channel energy is higher than the CCA threshold, the communication node may determine that the channel is busy.

Otherwise, the communication node may determine that the channel is idle. When it is determined that the channel is idle, the communication node may start the signal transmission in the UCell. The Wi-Fi standard (802.11ac) specifies a CCA threshold of 62 dBm for non-Wi-Fi signals and a CCA threshold of −82 dBm for Wi-Fi signals. The sires of processes described above may be referred to as Listen-Before-Talk (LBT) or a channel access procedure (CAP). The LBT may be interchangeably used with the CAP.

In Europe, two LBT operations are defined: frame based equipment (FBE) and load based equipment (LBE). In FBE, one fixed frame is made up of a channel occupancy time (e.g., 1 to 10 ms), which is a time period during which once a communication node succeeds in channel access, the communication node may continue transmission, and an idle period corresponding to at least 5% of the channel occupancy time, and CCA is defined as an operation of observing a channel during a CCA slot (at least 20 us) at the end of the idle period. The communication node performs CCA periodically on a fixed frame basis. When the channel is unoccupied, the communication node transmits during the channel occupancy time, whereas when the channel is occupied, the communication node defers the transmission and waits until a CCA slot in the next period.

In LBE, the communication node may set $q \in \{4, 5, \ldots, 32\}$ and then perform CCA for one CCA slot. When the channel is unoccupied in the first CCA slot, the communication node may secure a time period of up to $(13/32)q$ ms and transmit data in the time period. When the channel is occupied in the first CCA slot, the communication node randomly selects $N \in \{1, 2, \ldots, q\}$, stores the selected value as an initial value, and then senses a channel state on a CCA slot basis. Each time the channel is unoccupied in a CCA slot, the communication node decrements the stored counter value by 1. When the counter value reaches 0, the communication node may secure a time period of up to $(13/32)q$ ms and transmit data.

Example: Signal Transmission in NR-U

The 3GPP standardization group has been working on standardization of a 5G wireless communication system called new RAT (NR). The 3GPP NR system has been designed to support a plurality of logical networks in a single physical system and provide services with various requirements (e.g., eMBB, mMTC, URLLC, and so on) by changing a transmission time interval (TTI) and an OFDM numerology (e.g., an OFDM symbol duration, an SCS, and so on). With the recent emergence of smart devices, data traffic has significantly increased. In this context, use of an unlicensed band for cellular communication is under consideration in the 3GPP NR system, as is the case with licensed-assisted access (LAA) of the legacy 3GPP LTE system. Compared to the LAA, however, an NR cell in the unlicensed-band (NR U-cell) aims to support a standalone (SA) operation. For example, PUCCH, PUSCH, and sound reference signal (SRS) transmissions may be supported in the NR UCell.

To support an SA operation in a U-band, an HARQ-ACK feedback operation (for convenience, HARQ-ACK will be referred to as A/N) of a UE based on a PUCCH/PUSCH transmission in the U-band in response to reception of DL data (e.g., a PDSCH) may be essential. For example, a BS may schedule a PDSCH transmission for a specific UE in a channel occupancy time (COT) period secured by performing LBT (e.g., CCA) and indicate to the UE to transmit an A/N feedback for the PDSCH reception in the same COT period (or any gNB-initiated COT period started/occupied by a DL transmission of the BS). This process is referred to as an intra-COT A/N transmission, for convenience. In another example, the BS may indicate to the UE to transmit an A/N feedback for a PDSCH reception which has been scheduled/transmitted in a specific COT period in another COT period subsequent to the COT period (or a period that does not belong to the above gNB-initiated COT period) in view of a UE processing time involved in decoding of the PDSCH signal and encoding of a corresponding HARQ-ACK signal. This process is referred to as an inter-COT A/N transmission, for convenience (hereinbelow, LBT or CCA is referred to as LBT, for convenience).

In a U-band situation, one component carrier (CC) or BWP may be configured for a UE as a wideband (WB) CC or BWP having a larger bandwidth (BW) than in legacy LTE. However, a BW requiring CCA based on an independent LBT operation may be limited even in the WB CC/BWP (according to a specific regulation). In this context, when a subband for which LBT is individually performed is defined as an LBT-subband (LBT-SB), one WB CC/BWP may include a plurality of LBT-SBs.

Figure 9:
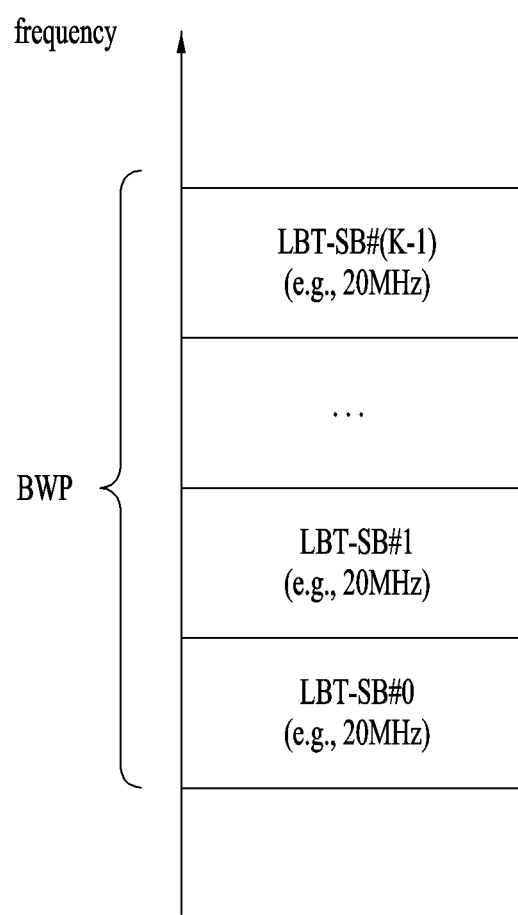
FIG. 9 illustrates an exemplary bandwidth part (BWP) structure.

FIG. 9 illustrates a BWP of a cell, which includes a plurality of LBT-SBs. An LBT-SB may be, for example, a band of 20 MHz. The LBT-SB may include a plurality of consecutive (P)RBs, and thus may be referred to as a (P)RB set. While not shown, a guard band (GB) may be interposed between LBT-SBs. Accordingly, the BWP may be configured in the form of {LBT-SB #0 (RB set #0)+GB #0+LBT-SB #1 (RB set #1+GB #1)+ . . . +LBT-SB #(K−1) (RB set (#K−1))}. For convenience, LBT-SB/RB indexes may be configured/defined in an increasing order from the lowest frequency to the highest frequency.

In the U-band situation, considering that the UE may fail in LBT for a UL transmission (e.g., an A/N PUCCH) (and thus drop the A/N PUCCH transmission), a method may be considered, in which a plurality of candidate PUCCH resources in time and/or frequency are indicated/configured (by higher-layer signaling (e.g., RRC signaling) and/or DCI) and a UE transmits an A/N PUCCH in a specific (one) PUCCH resource for which the UE has succeeded in LBT among the plurality of candidate PUCCH resources.

For example, for a single A/N PUCCH transmission, a plurality of candidate PUCCH resources (e.g., slots or symbol groups) multiplexed in TDM in the time domain may be indicated/configured (candidate T-domain resources). The UE may attempt LBT in the plurality of candidate PUCCH resources sequentially in time and transmit an A/N PUCCH in a specific (one) PUCCH resource in which the UE has succeeded in CCA (for the first time). In another example, for a single A/N PUCCH transmission, a plurality of candidate PUCCH resources (e.g., LBT-SBs/BWPs/CCs) multiplexed in FDM in the frequency domain may be indicated/configured (candidate F-domain resources). The UE may attempt LBT in the plurality of candidate PUCCH resources (at the same time) and transmit an A/N PUCCH in a specific (one) PUCCH resource in which the UE has succeeded in CCA.

The present disclosure proposes resource allocation for a UL (physical) channel transmission based on a plurality of (candidate) F-domain resources (e.g., LBT-SBs, BWPs, or CCs) in a U-band situation, and a related UE operation. For example, the present disclosure proposes allocation of PUCCH resources for an (A/N) PUCCH transmission and a method of operating a UE.

The proposed methods of the present disclosure may be applied in a similar manner to an operation/process of transmitting other USI (e.g., CSI and an SR) on a PUCCH/PUSCH, data on a PUSCH, or an SRS, not limited to the operation/process of transmitting an A/N feedback on a PUCCH/PUSCH.

Further, the proposed methods of the present disclosure may be applied in a similar manner to an L-band (or U-band) operation without LBT, not limited to an LBT-based U-band operation.

(0) Unit Resource for UL (Physical) Channel/Signal Transmission

In the U-band environment, a (single) set of (equidistant) non-consecutive RBs in frequency may be defined as a unit resource used/allocated for transmission of a UL (physical) channel/signal in consideration of a regulation related to an occupied channel bandwidth (OCB) and a power spectral density (PSD). This non-consecutive RB set is defined as an "RB interlace", for convenience.

Figure 10:
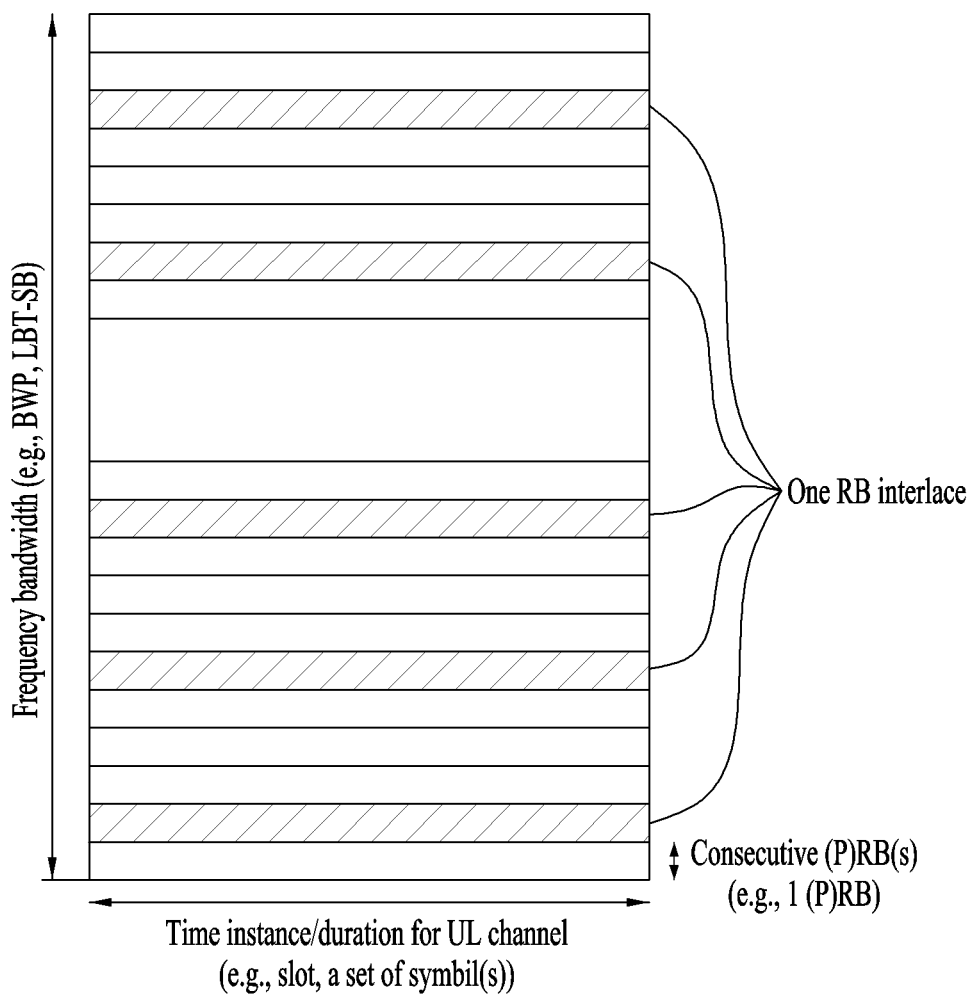
FIGS. 10 and 11 illustrate exemplary resource block (RB) interlaces.

FIG. 10 illustrates an RB interlace. Referring to FIG. 10, an RB interlace may be defined as non-consecutive RBs in a frequency band. For example, four RB interlaces may be available out of 20 RBs, and each RB interlace may include {RB #N, RB #(N+4), . . . }(N=0-3). A transmitter (e.g., a UE) may use one or more interlaces to transmit a signal/channel. The frequency band may include a (wideband) CC/BWP/LBT-SB, and an RB may include a PRB. An RB interlace may be defined by frequency resources or frequency/time resources. When an RB interlace refers to frequency/time resources, the time resources may be defined as a time instance/period for a UL (physical) channel/signal (or a UL (physical) channel/signal transmission occasion). The time resources may include a slot or a symbol set. The symbol set includes one or more consecutive symbols for the UL (physical) channel/signal. A symbol includes an OFDM-based symbol (e.g., a CP-OFDM symbol, an SC-FDMA symbol, and a DFT-s-OFDM symbol). The UL (physical) channel/signal may include a PUCCH, a PUSCH, or an SRS.

Figure 11:
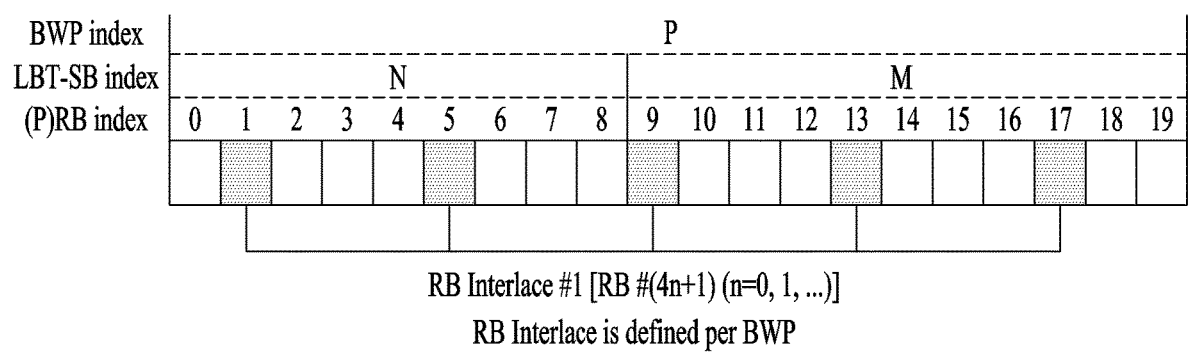
Figure 11:
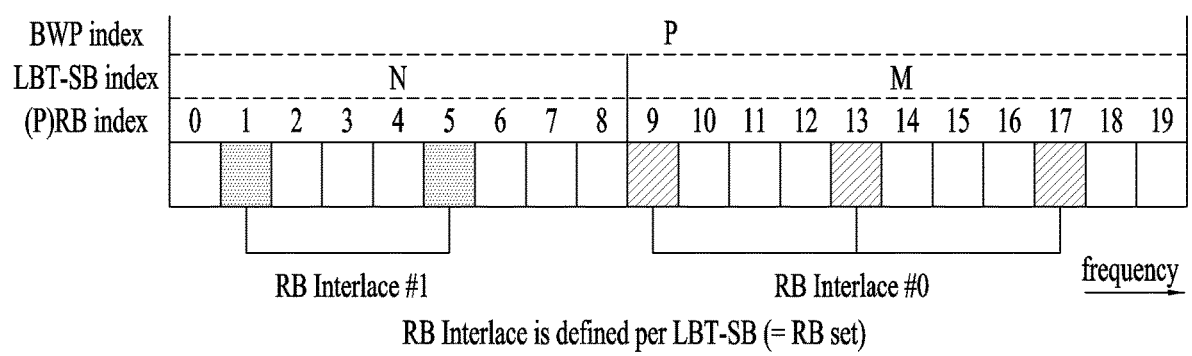

FIG. 11 illustrates methods of defining an RB interlace (RB interlace indexing).

Referring to FIG. 11, when one (wideband) CC/BWP (hereinafter, referred to as BWP) includes a plurality of LBT-SBs, the following two options may be considered to define an RB interlace (RB interlace indexing) in the BWP (for transmitting a UL channel). While LBT-SBs are shown as consecutive in FIG. 11, a GB may be configured between LBT-SBs.

1) Opt 1: An RB Interlace (RB Interlace Indexing) is Defined Based on a BWP (FIG. 11(a)).

One interlace (index) may be defined as a set of all RBs spaced from each other by a specific equal distance, starting from a specific RB index in the BWP, among all RBs of the BWP (or a plurality of LBT-SBs included in the BWP).

2) Opt 2: An RB Interlace (RB Interlace Indexing) is Defined on an LBT-SB Basis (FIG. 11(b)).

One interlace (index) in each LBT-SB (index) may be defined as a set of RBs spaced from each other by a specific equal distance, starting from a specific RB index (in the LBT-SB), among all RBs of the LBT-SB.

(1) UL (Physical) Channel (e.g., PUCCH) Resource Allocation Based on a Plurality of Candidate LBT-SBs Depending on an option of defining an RB interlace (RB interlace indexing), the following methods may be considered for UL channel resource allocation based on a plurality of candidate LBT-SBs. Specifically, the following (single) PUCCH resource allocation methods may be considered based on each option. PUCCH resource allocation (RA) information may be preconfigured by higher-layer signaling (e.g., RRC signaling). Further, the PUCCH RA information may be indicated by a PDCCH that schedules a PDSCH (i.e., DL grant DCI), and HARQ-ACK information for the PDSCH may be transmitted in allocated PUCCH resources.

Figure 12:
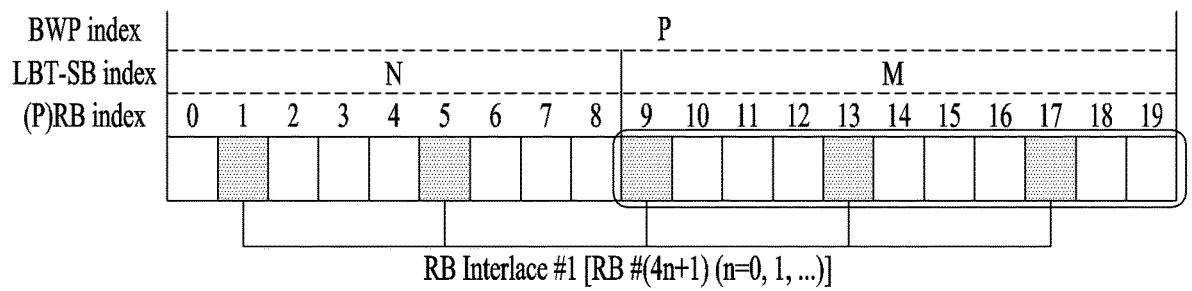
FIGS. 12 and 13 illustrate exemplary RB interlace-based resource allocations.
Figure 12:
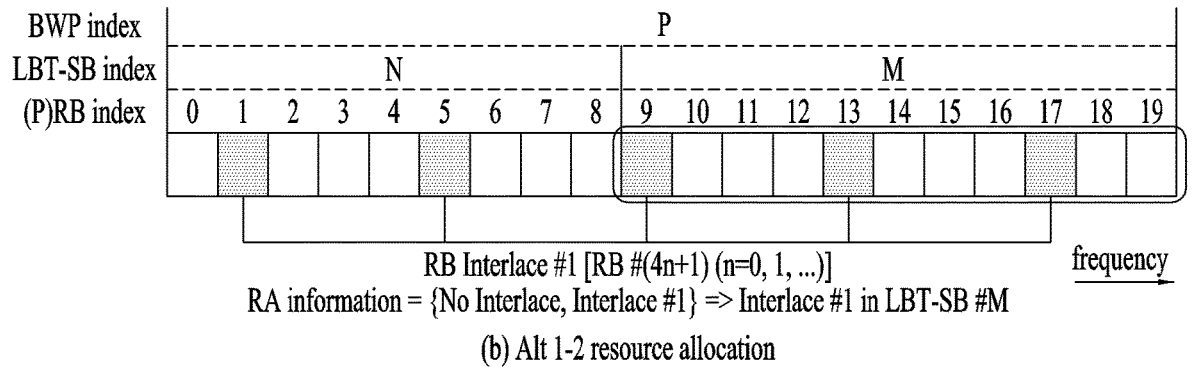

1) Opt 1: Case in Which an RB Interlace (RB Interlace Indexing) is Defined Based on a BWP Alt 1-1: A PUCCH resource may be allocated by "single interlace index+LBT-SB index bitmap". For example, once one RB interlace index is indicated, an LBT-SB to be allocated as a candidate PUCCH resource among a plurality of LBT-SBs spanned by the (indicated) interlace is indicated (e.g., by an LBT-SB index bitmap). In this manner, one PUCCH resource may be configured. FIG. 12(a) illustrates RA based on Alt 1-1. RA information may include information about {interlace index, LBT-SB bitmap}. Each bit of the bitmap indicates whether resources of a corresponding LBT-SB are allocated. In the illustrated case, the first bit of the bitmap indicates allocation of resources of LBT-SB #N, and the second bit of the bitmap indicates allocation of resources of LBT-SB #M. When the interlace index is #1 and the bitmap is '01', interlace #1 of LBT-SB #M may be allocated as a PUCCH resource.

Alt 1-2: A PUCCH resource may be allocated based on "an interlace index in each of a plurality of LBT-SBs". For example, one PUCCH resource may be configured by, for each of the plurality of LBT-SBs, indicating an RB interlace index to be allocated as a candidate PUCCH resource in the corresponding LBT-SB. The interlace index may include "no interlace allocation" (i.e., no interlace). FIG. 12(b) illustrates an exemplary RA based on Alt 1-2. RA information may include {interlace index of LBT-SB #N, interlace index of LBT-SB #M}. In the illustrated case of FIG. 12(b), no interlace of LBT-SB #N is allocated, and interlace #1 of LBT-SB #M is allocated, by way of example.

2) Opt 2: Case in which an RB Interlace (RB Interlace Indexing) is Defined on an LBT-SB Basis.

Figure 13:
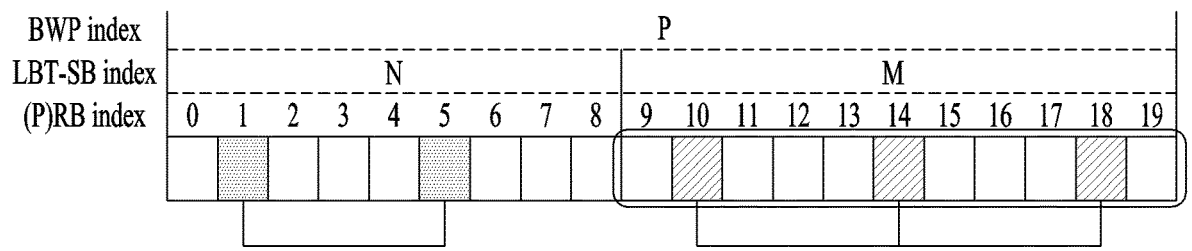
Figure 13:
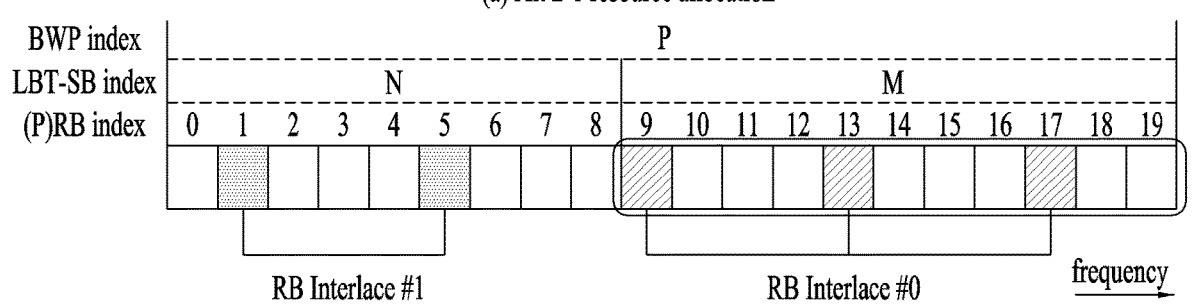

Alt 2-1: A PUCCH resource may be allocated by "single common interlace index+LBT-SB index bitmap". For example, once a (common) RB interlace index is indicated for all of a plurality of LBT-SBs, an LBT-SB to which an interlace to be allocated as a candidate PUCCH resource belongs is indicated among the plurality of LBT-SBs (e.g., by an LBT-SB index bitmap). In this manner, one PUCCH resource may be configured. FIG. 13(a) illustrates an exemplary RA based on Alt 2-1. Herein, RA information may include information about {common interlace index, LBT-SB bitmap}. Each bit of the bitmap indicates whether resources of a corresponding LBT-SB are allocated. In FIG. 13(a), the first bit of the bitmap indicates allocation of resources of LBT-SB #N, and the second bit of the bitmap indicates allocation of resources of LBT-SB #M. When the common interlace index is #1 and the bitmap is '01', interlace #1 of LBT-SB #M may be allocated as a PUCCH resource.

Alt 2-2: A PUCCH resource may be allocated based on "an interlace index in each of a plurality of LBT-SBs". For example, one PUCCH resource may be configured by, for each of the plurality of LBT-SBs, indicating an RB interlace index to be allocated as a candidate PUCCH resource in the corresponding LBT-SB. The interlace index may include "no interlace allocation" (i.e., no interlace). FIG. 13(b) illustrates an exemplary RA based on Alt 1-2. RA information may include {interlace index of LBT-SB #N, interlace index of LBT-SB #M}. In the illustrated case, no interlace of LBT-SB #N is allocated, and interlace #1 of LBT-SB #M is allocated, by way of example.

(2) UE Operation when LBT-SBs have Different Numbers of Allocated RBs

When a PUCCH resource is allocated in the above proposed methods (or any other method), a plurality of (candidate) LBT-SBs (i.e., interlaces configured in each LBT-SB) configured/allocated as the same one PUCCH resource may have different numbers of RBs. In this case, to avoid the burden of a (post)process (including an IFFT operation) which should be performed shortly after an LBT operation at the UE, the following PUCCH signal process and UE transmission operation may be considered. The number of RBs allocated to an LBT-SB may be the total number of RBs included in the LBT-SB or the number of RBs actually used in a UL channel transmission (e.g., the number of RBs in an RB interlace) within the LBT-SB.

1) The PUCCH is processed based on an LBT-SB with a minimum number of rbs among LBT-SBs.

A. The PUCCH may be subjected to a (pre)process (including an IFFT operation) based on an LBT-SB with a minimum number of RBs among a plurality of (candidate) LBT-SBs. Specifically, based on the minimum number M of RBs, the UE may determine a maximum UCI payload size (according to a configured maximum UCI coding rate), (the number of) coded UCI bits (for UCI encoding/rate-matching), and a DMRS sequence (length), and perform an IFFT operation (with a frequency input size of M RBs) and a UL power control operation (applied to the M-RB allocation). When the PUCCH format of the PUCCH requires a DFT operation and the minimum of the numbers of RBs of the LBT-SBs is not a multiple of {2, 3, 5}(e.g., 11 RBs), the maximum UCI payload size, the (number of) coded UCI bits, and the DMRS sequence (length) may be determined, and the IFFT operation and the UL power control operation may be performed, based on the largest integer M (e.g., M=10) which is smaller than the minimum number of RBs and is a multiple of {2, 3, 5}.

B. Based on the above description, when there is any LBT-SB configured with M (the minimum number of RBs) RBs among LBT-SBs for which LBT is successful, the UE may select the LBT-SB configured with M RBs (as a PUCCH transmission band) with priority. When an LBT-SB with more RBs than M is selected as the PUCCH transmission band (from among the LBT-SBs for which LBT is successful), the PUCCH signal may be mapped to/transmitted in M RBs with the lowest or highest indexes among the RBs configured in the LBT-SB.

2) Case in which a plurality of LBT-SBs are allocated/scheduled as a single PUSCH transmission resource.

A. A plurality of (e.g., two) LBT-SBs may be allocated as a single PUSCH transmission resource, and a PUSCH transmission in DFT-s-OFDM modulation may be indicated/configured. In this case, for each of the LBT-SBs, when the number of RBs configured in the LBT-SB is not a multiple of {2, 3, 5}(e.g., 11 RBs), a PUSCH signal may be mapped/transmitted (e.g., (the number of) coded bits for rate-matching and a DMRS sequence (length) may be determined, and an IFFT operation and a UL power control operation may be performed) based on M RBs (e.g., M=10) where M is the largest integer smaller than the number of RBs and a multiple of {2, 3, 5}. For example, when 10 RBs and 11 RBs are allocated to LBT-SB index 0 and LBT-SB index 1, respectively, only 10 RBs of LBT-SB index 1 may be used for PUSCH signal mapping/transmission. In another example, when 11 RBs are allocated to each of LBT-SB index 0 and LBT-SB index 1, only 10 RBs of each of LBT-SB index 0 and LBT-SB index 1 may be used for PUSCH signal mapping/transmission.

B. When the number M' of RBs initially configured for a PUSCH transmission in an LBT-SB is larger than the number M of RBs used in an actual PUSCH mapping/transmission, the PUSCH signal may not be mapped to/transmitted in the remaining L RBs (L=(M'−M)). The PUSCH signal may be mapped to/transmitted in M RBs with the highest indexes in an LBT-SB with a low LBT-SB index (in a low frequency band) or in M RBs with the lowest indexes in an LBT-SB with a high LBT-SB index (in a high frequency band). It is assumed herein that RBs are indexed in an increasing order from a low frequency to a high frequency. From the perspective of PUSCH mapping, a low LBT-SB index or a high LBT-SB index may depend on the relative position of an LBT-SB with respect to the center frequency of the BWP. For example, the M RBs which the PUSCH signal is mapped to/transmitted in may be determined to be M RBs with the highest indexes in an LBT-SB in a frequency band lower than the center (frequency) of the BWP and M RBs with the lowest indexes in an LBT-SB in a frequency band higher than the center (frequency) of the BWP.

Additionally, for a single SRS transmission, a plurality of candidate F-domain resources (e.g., LBT-SBs/BWPs/CCs) separated in the frequency domain may be configured. The UE may attempt LBT in the plurality of (frequency) resources (e.g., LBT-SBs) (at the same time) and transmit an SRS in a specific (one) resource (e.g., LBT-SB) in which the UE has succeeded in CCA. Accordingly, a principle similar to that in the above proposal may be applied to the SRS transmission, and thus, the following SRS signal process and UE transmission operation may be considered.

1) The SRS is processed based on the minimum of the numbers of RBs in LBT-SBs.

A. The SRS may be subjected to a (pre)process (including an IFFT operation) based on the minimum of the numbers of RBs in a plurality of (candidate) LBT-SBs. For example, the UE may determine an SRS sequence (length) and perform an IFFT operation (with a frequency input size of M RBs) and a UL power control operation (applied to the M-RB allocation), based on the minimum number M of RBs.

B. Based on the above description, when there is any LBT-SB configured with M (the minimum number of RBs) RBs among LBT-SBs for which LBT is successful, the UE may select the LBT-SB configured with M RBs (as an SRS transmission band) with priority. When an LBT-SB with more RBs than M is selected as the SRS transmission band (from among the LBT-SBs for which LBT is successful), the SRS signal may be mapped to/transmitted in M RBs with the lowest or highest indexes among the RBs configured in the LBT-SB.

In the above proposed method, "minimum number of RBs" may be replaced with "maximum number of RBs".

Figure 14:
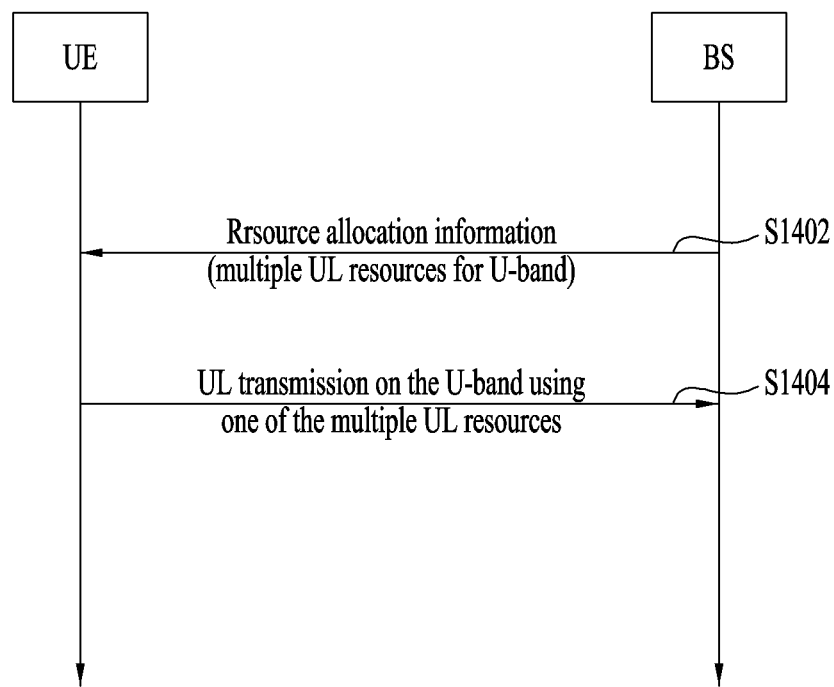
FIG. 14 illustrates an uplink (UL) transmission according to an example of the present disclosure.

FIG. 14 illustrates an exemplary UL transmission process according to an example of the present disclosure. Referring to FIG. 14, a BS may transmit RA information to a UE (S1402). The RA information may include information about one or more (candidate) UL resources for a U-band (e.g., CC/BWP). The UL resources include physical resources for transmission of a UL physical channel/signal (e.g., PUCCH, PUSCH, or SRS). For example, the UL resources may include a (P)RB set for transmission of the UL physical channel/signal (e.g., PUCCH, PUSCH, or SRS). The plurality of UL resources may be multiplexed in TDM in the time domain or in FDM in the frequency domain. The RA information may be indicated by higher-layer signaling (e.g., RRC signaling) and/or DCI according to a proposed method. Then, the UE may perform a UL transmission in one specific UL resource for which CCA is successful among the one or more (candidate) UL resources. When CCA is successful for a plurality of UL resources (e.g., a plurality of LBT-SBs), the UL transmission may be performed in one specific UL resource (e.g., an RB interlace in a specific LBT-SB) selected according to the afore-described method.

(3) Method of Configuring Wideband BWP Including a Plurality of LBT-SBs and Transmission Method It may be necessary to define a wideband BWP configuration (including a plurality of LBT-SBs) and a transmission and reception operation based on the wideband BWP configuration in consideration of a regulation on an LBT operation (in frequency) and GB management in a U-band situation. For this purpose, the following methods may be considered. In the present disclosure, a CC/cell BW (an RB set/index in the BW) may refer to a (virtual) BW (the RB set/index in the BW) based on (e.g., starting from) a separately configured specific frequency position, reference point A. In the present disclosure, an LBT-SB (an RB set in a corresponding BW) may refer to a unit BW (e.g., 20 MHz) (or an RB set corresponding to the unit BW) requiring individual/independent LBT or a BW except for a GB in the unit BW (or an RB set corresponding to the BW except for the GB).

1) Method 1

A. An SB-RB range corresponding to each single LBT-SB may be configured based on an RB set in a CC/cell BW (RB indexes in the RB set) (hereinafter, referred to as a CRB set/index). An SB-RB range may be configured/defined by a starting RB index and an ending RB index or a total number of RBs with consecutive indexes from a starting RB, based on a CRB set/index.

B. A BWP-RB range corresponding to each single BWP may be configured based on a CRB set/index. The BWP-RB range may be configured/defined by a starting RB index and an ending RB index or a total number of RBs with consecutive indexes from a starting RB, based on the CRB set/index.

C. One BWP-RB range may be configured to include one or more SB-RB ranges (always a corresponding whole range for each SB-RB).

2) Method 2

A. An SB-RB range corresponding to each single LBT-SB may be configured based on a CRB set/index, and the index of each SB-RB range may be set/configured according to the frequency position of each LBT-SB or SB-RB range. For example, the indexes of SB-RB range may be continuously set/configured from a low frequency to a high frequency.

B. For each BWP, a combination of the indexes of the SB-RB ranges included in the BWP may be configured.

C. One BWP may be configured to include one or more consecutive SB-RB range indexes. For example, (for each BWP) a starting index and an ending index (or a total number of SB-RB ranges starting from the starting index) may be configured for a set of consecutive SB-RB ranges.

3) Method 3

A. A BWP-RB range corresponding to each BWP may be configured based on a CRB set/index.

B. Based on an RB set (the RB indexes of the RB set) (hereinafter, referred to as an LRB set/index) in each BWP, an SB-RB range corresponding to each single LBT-SB belonging to/included in the BWP may be configured/defined.

C. When a plurality of RB ranges are configured in a specific BWP based on Method 1/2/3 or any other method, each RB range may correspond to a single different LBT-SB. Accordingly, an RB range including a plurality of LBT-SBs may not be configured.

For UL (e.g., PUSCH) scheduling/transmission, a wideband UL BWP including a plurality of LBT-SBs or a plurality of SB-RB ranges corresponding to the plurality of LBT-SBs may be configured.

Figure 15:
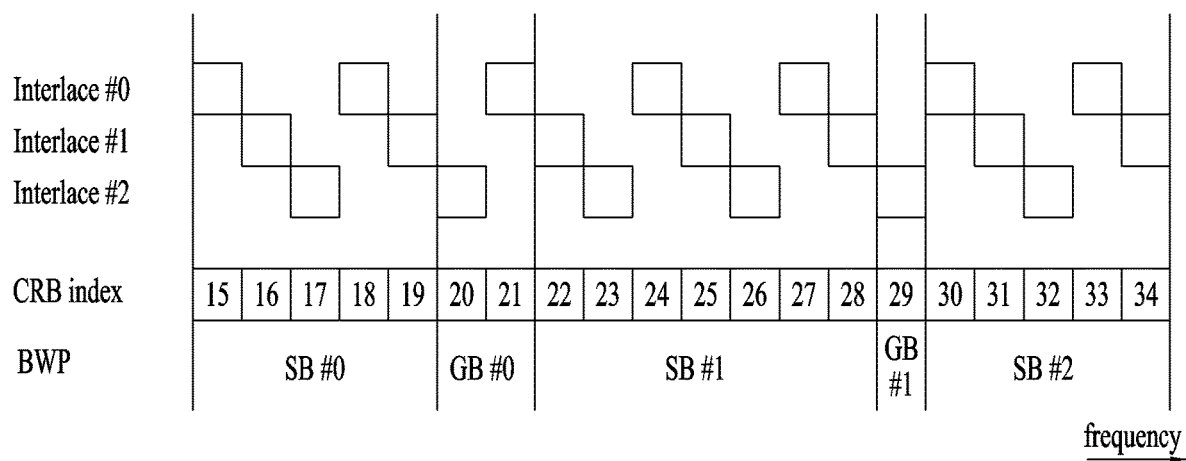
FIG. 15 illustrates exemplary subbands/guard bands and interlaces in a BWP.

FIG. 15 illustrates exemplary UL resources according to an example of the present disclosure. Referring to FIG. 15, a BWP includes a plurality of LBT-SBs (or SB-RB ranges) (hereinafter, referred to as SBs) and a GB between LBT-SBs.

For example, the BWP may include {SB #0+GB #0+SB #1+GB #1+SB #2}. (P)RBs included in the SBs/GBs of the BWP may be defined/configured based on a CRB set/index. The BWP may include a plurality of (RB) interlaces. For example, when (RB) interlaces are defined/configured on a BWP basis (FIG. 11(a)), each (RB) interlace may include the following RBs in FIG. 15.

Interlace #0: CRB indexes {15, 18, 21, 24, 27, 30, 33}
Interlace #1: CRB indexes {16, 19, 22, 25, 28, 31, 34}
Interlace #2: CRB indexes {17, 20, 23, 26, 29, 32}

A final UL (PUSCH) resource to be actually transmitted/used may be determined (by the UE) in the following manner according to an SB-RB range combination/interlaces indicated as UL (PUSCH) transmission resources. When it is said that a plurality of LBT-SBs or SB-RB ranges are consecutive (in frequency), this may imply that a gap between the LBT-SBs or SB-RB ranges is equal to or less than a specific level (e.g., a maximum BW defined as a GB) or the indexes of the plurality of LBT-SBs or SB-RB ranges are consecutive.

Figure 16:
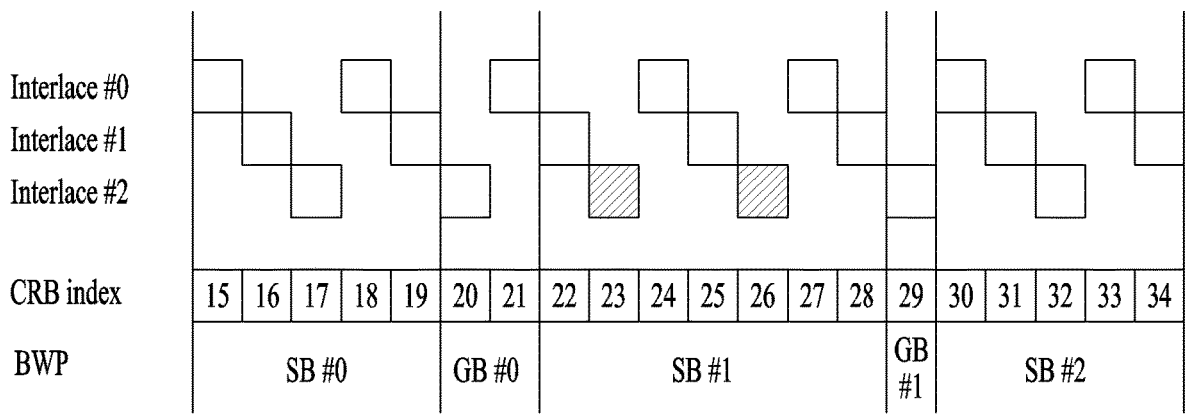
FIG. 16 illustrates exemplary resource allocations for UL transmissions.
Figure 16:
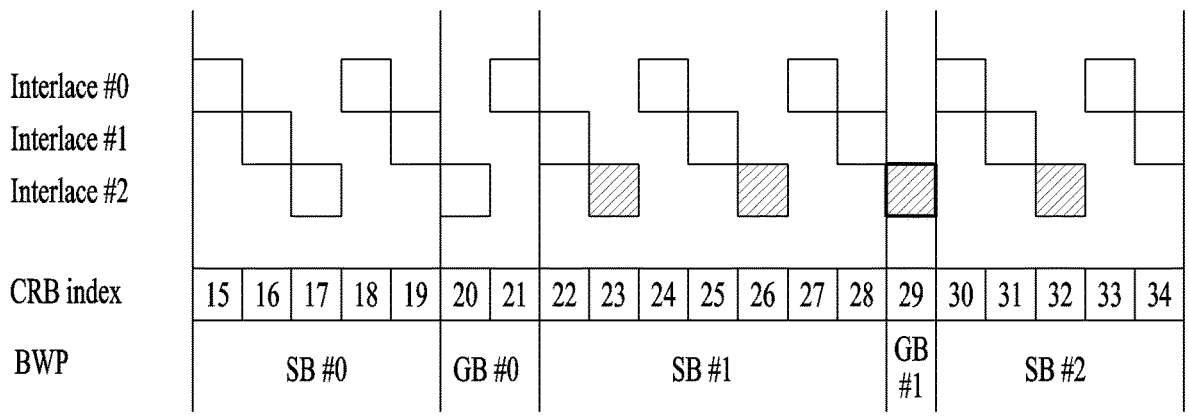

1) Case 1: When one SB-RB range index is indicated as a UL (PUSCH) transmission resource, the indicated SB-RB range (or a separately indicated RB resource (e.g., interlace) set for the SB-RB range) may be determined as the final UL (PUSCH) resource. For example, referring to FIG. 16(a), based on RA information for a PUSCH indicating {interlace #1, SB #1}, RBs belonging to interlace #1 in SB #1 may be determined as a PUSCH resource. That is, the RBs corresponding to the intersection of {interlace #1, SB #1} may be determined as the PUSCH resource. GBs (e.g., GB #0 and GB #1) adjacent to SB #1 are not used as the PUSCH transmission resource.

2) Case 2: When a plurality of consecutive SB-RB range indexes are indicated as a UL (PUSCH) transmission resource, a gap between the indicated SB-RB ranges may also be used as an available RB resource. That is, the indicated SB-RB ranges and the gap between the indicated SB-RB ranges (or a separately indicated RB resource (e.g., interlace) set for the indicated SB-RB ranges and the gap between the indicated SB-RB ranges) may be determined as a final UL (PUSCH) resource.

A. For example, when the number of consecutive SB-RB range indexes is 2, an RB range corresponding to {SB-RB range+gap+SB-RB range} (a separately indicated RB resource (e.g., interlace) set for the corresponding SB-RB range) may be determined as the final UL (PUSCH) resource.

B. For example, when SB-RB range index #0 and SB-RB range index #1 are indicated, an RB range corresponding to {SB-RB range index #0, gap, SB-RB range index #1}(a separately indicated RB resource (e.g., interlace) set for the range) may be determined as the final UL (PUSCH) resource.

C. In another example, when SB-RB range index #0, SB-RB range index #1, and SB-RB range index #2 are indicated, an RB range corresponding to {SB-RB range index #0, gap, SB-RB range index #1, gap SB-RB range index #2}(a separately indicated RB resource (e.g., interlace) set for the range) may be determined as the final UL (PUSCH) resource.

D. For example, referring to FIG. 16(b), based on RA information for a PUSCH indicating {interlace #2, SB #1/#2}, RBs belonging to interlace #2 in SB #1/#2 may be determined as a PUSCH resource. The GB between SB #1 and SB #2, that is, GB #1 may also be used as the PUSCH transmission resource. That is, the RBs corresponding to the intersection of {interlace #1, SB #1/#2+GB #1} may be determined as the PUSCH resource. A GB (i.e., GB #0) adjacent to SB #1/#2 but not interposed between SB #1 and SB #2 is not used as the PUSCH transmission resource.

3) Case 3: When a plurality of non-consecutive SB-RB range indexes are indicated as a UL (PUSCH) transmission resource, each of the indicated SB-RB ranges (a separately indicated RB (e.g., interlace) set for the corresponding range) may be determined as a final UL (PUSCH) resource.

A. For example, when SB-RB range index #0 and SB-RB range index #2 are indicated, an RB range corresponding to {SB-RB range index #0, SB-RB range index #2}(e.g., a non-consecutive RB range in which a gap between the two SB-RB ranges is not used) may be determined as a final UL (PUSCH) resource.

B. In another example, when SB-RB range index #0, SB-RB range index #1, and SB-RB range index #3 are indicated, an RB range corresponding to {range #0, gap between range #0 and range #1, range #1, range #3}(e.g., a separately indicated RB set (e.g., interlace) for the corresponding range) may be determined as a final UL (PUSCH) resource.

Figure 17:
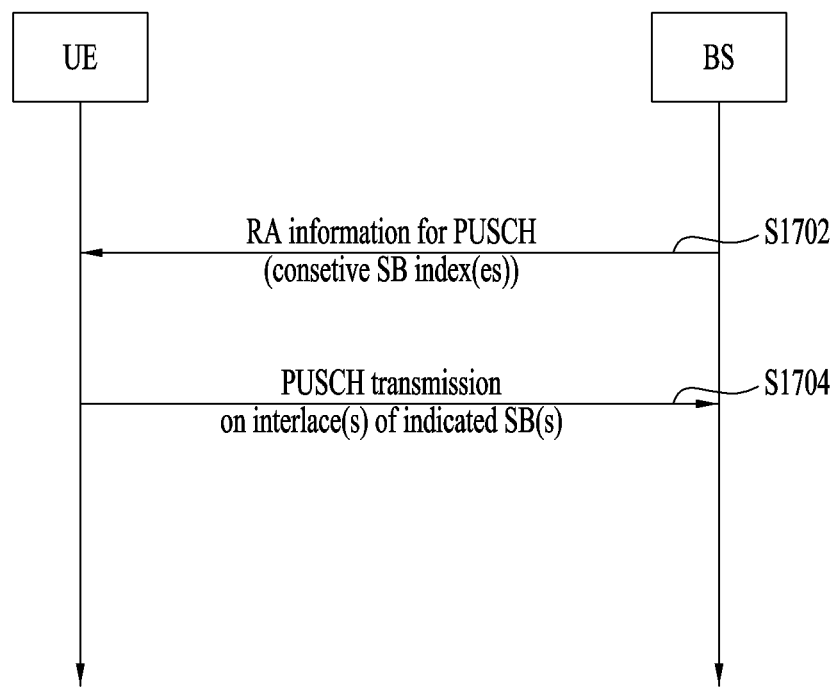
FIG. 17 illustrates a UL transmission according to another example of the present disclosure.

FIG. 17 is a diagram illustrating an exemplary UL transmission (e.g., a PUSCH transmission) according to an example of the present disclosure.

Referring to FIG. 17, a UE may receive RA information for a PUSCH transmission from a BS (S1702). The RA information may include information about consecutive SB index(es). The RA information may be received by higher-layer signaling (e.g., RRC signaling) or on a PDCCH (i.e., by DCI). An SB corresponds to an LBT-SB/an SB-RB range. The SB may be configured in a BWP, which may have, for example, the structure illustrated in FIGS. 15 and 16. Subsequently, the UE may perform the PUSCH transmission in interlace(s) of SB(s) (within the BWP) indicated by the RA information (S1704). The PUSCH transmission may be performed in an unlicensed band (e.g., a UCell or an unlicensed/shared spectrum). Based on the RA information indicating only one SB index, the PUSCCH transmission may be performed only in the interlace(s) of the indicated SB (FIG. 16(a)). Based on the RA information indicating a plurality of SB indexes, the PUSCH transmission may be performed using (i) the indicated plurality of SBs and (ii) the interlace(s) within the GB(s) between the indicated plurality of SBs.

With a GB (an RB set corresponding to the GB) configured (between adjacent LBT-SBs) in a BWP/CC BW, RB range(s) including only consecutive RB indexes (except for the GB) may be (automatically) configured. In this case, the proposed methods may be applied by replacing/considering an RB range and a GB with/as an SB-RB range and a gap, respectively.

The various descriptions, functions, procedures, proposals, methods, and/or operation flowcharts of the present disclosure described herein may be applied to, but not limited to, various fields requiring wireless communication/connectivity (e.g., 5G) between devices.

More specific examples will be described below with reference to the drawings. In the following drawings/description, like reference numerals denote the same or corresponding hardware blocks, software blocks, or function blocks, unless otherwise specified.

Figure 18:
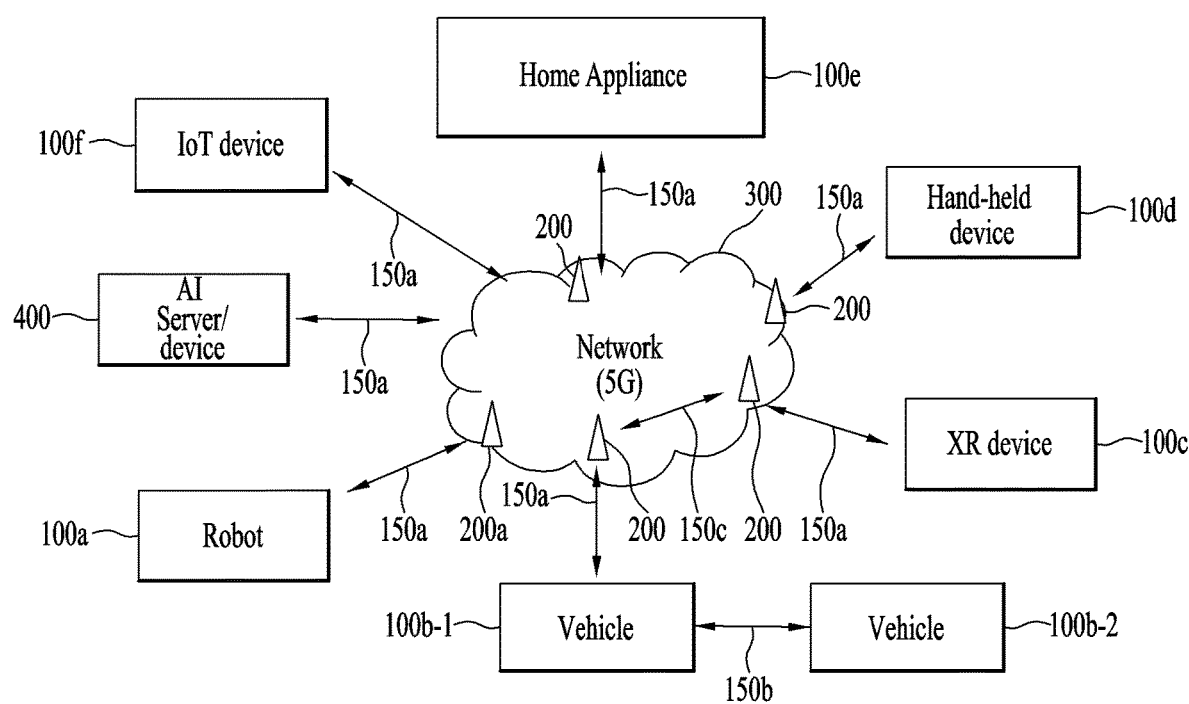
FIGS. 18 to 21 illustrate a communication system 1 and wireless devices, which are applied to the present disclosure.

FIG. 18 illustrates a communication system 1 applied to the present disclosure.

Referring to FIG. 18, the communication system 1 applied to the present disclosure includes wireless devices, BSs, and a network. A wireless device is a device performing communication using radio access technology (RAT) (e.g., 5G NR (or New RAT) or LTE), also referred to as a communication/radio/5G device. The wireless devices may include, not limited to, a robot 100*a*, vehicles 100*b*-1 and 100*b*-2, an extended reality (XR) device 100*c*, a hand-held device 100*d*, a home appliance 100*e*, an IoT device 100*f*, and an artificial intelligence (AI) device/server 400. For example, the vehicles may include a vehicle having a wireless communication function, an autonomous driving vehicle, and a vehicle capable of vehicle-to-vehicle (V2V) communication. Herein, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television (TV), a smartphone, a computer, a wearable device, a home appliance, a digital signage, a vehicle, a robot, and so on.

The hand-held device may include a smartphone, a smartpad, a wearable device (e.g., a smartwatch or smart glasses), and a computer (e.g., a laptop). The home appliance may include a TV, a refrigerator, a washing machine, and so on. The IoT device may include a sensor, a smartmeter, and so on. For example, the BSs and the network may be implemented as wireless devices, and a specific wireless device 200*a* may operate as a BS/network node for other wireless devices.

The wireless devices 100*a* to 100*f* may be connected to the network 300 via the BSs 200. An AI technology may be applied to the wireless devices 100*a* to 100*f*, and the wireless devices 100*a* to 100*f* may be connected to the AI server 400 via the network 300. The network 300 may be configured using a 3G network, a 4G (e.g., LTE) network, or a 5G (e.g., NR) network. Although the wireless devices 100*a* to 100*f* may communicate with each other through the BSs 200/network 300, the wireless devices 100*a* to 100*f* may perform direct communication (e.g., sidelink communication) with each other without intervention of the BSs/network. For example, the vehicles 100*b*-1 and 100*b*-2 may perform direct communication (e.g. V2V/vehicle-to-everything (V2X) communication). The IoT device (e.g., a sensor) may perform direct communication with other IoT devices (e.g., sensors) or other wireless devices 100*a* to 100*f*.

Wireless communication/connections 150*a*, 150*b*, and 150*c* may be established between the wireless devices 100*a* to 100*f*/BS 200 and between the BSs 200. Herein, the wireless communication/connections may be established through various RATs (e.g., 5G NR) such as UL/DL communication 150*a*, sidelink communication 150*b* (or, D2D communication), or inter-BS communication (e.g. relay or integrated access backhaul (IAB)). Wireless signals may be transmitted and received between the wireless devices, between the wireless devices and the BSs, and between the BSs through the wireless communication/connections 150*a*, 150*b*, and 150*c*. For example, signals may be transmitted and receive don various physical channels through the wireless communication/connections 150*a*, 150*b* and 150*c*. To this end, at least a part of various configuration information configuring processes, various signal processing processes (e.g., channel encoding/decoding, modulation/demodulation, and resource mapping/demapping), and resource allocation processes, for transmitting/receiving wireless signals, may be performed based on the various proposals of the present disclosure.

Figure 19:
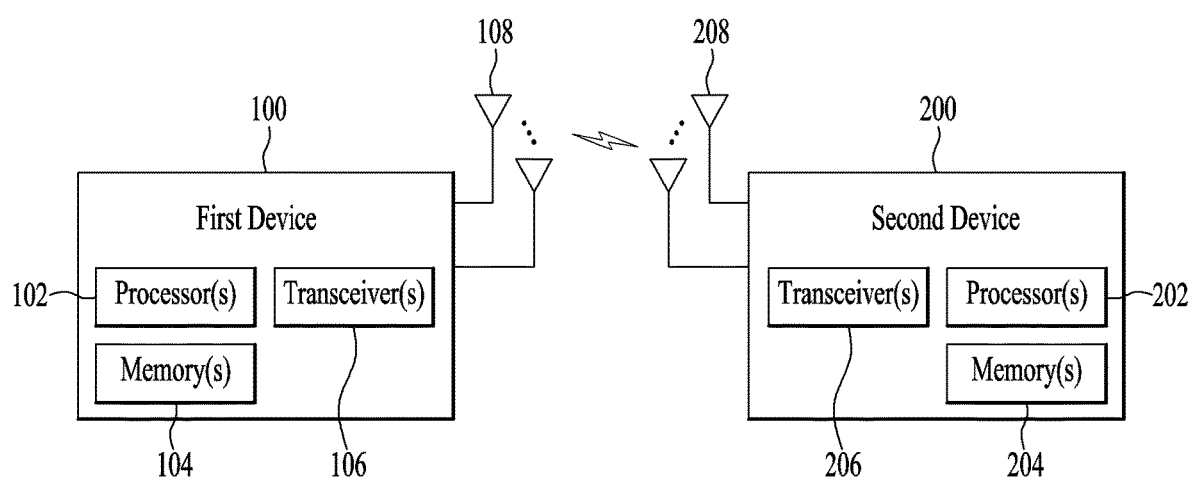

FIG. 19 illustrates wireless devices applicable to the present disclosure.

Referring to FIG. 19, a first wireless device 100 and a second wireless device 200 may transmit wireless signals through a variety of RATs (e.g., LTE and NR). {The first wireless device 100 and the second wireless device 200} may correspond to {the wireless device 100*x* and the BS 200} and/or {the wireless device 100*x* and the wireless device 100*x*} of FIG. 18.

The first wireless device 100 may include one or more processors 102 and one or more memories 104, and further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operation flowcharts disclosed in this document. For example, the processor(s) 102 may process information in the memory(s) 104 to generate first information/signals and then transmit wireless signals including the first information/signals through the transceiver(s) 106. The processor(s) 102 may receive wireless signals including second information/signals through the transceiver(s) 106 and then store information obtained by processing the second information/signals in the memory(s) 104. The memory(s) 104 may be connected to the processor(s) 102 and may store various pieces of information related to operations of the processor(s) 102. For example, the memory(s) 104 may store software code including instructions for performing all or a part of processes controlled by the processor(s) 102 or for performing the descriptions, functions, procedures, proposals, methods, and/or operation flowcharts disclosed in this document. The processor(s) 102 and the memory(s) 104 may be a part of a communication modem/circuit/chip designed to implement RAT (e.g., LTE or NR). The transceiver(s) 106 may be connected to the processor(s) 102 and transmit and/or receive wireless signals through the one or more antennas 108. Each of the transceiver(s) 106 may include a transmitter and/or a receiver. The transceiver(s) 106 may be interchangeably used with radio frequency (RF) unit(s). In the present disclosure, the wireless device may be a communication modem/circuit/chip.

The second wireless device 200 may include one or more processors 202 and one or more memories 204, and further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operation flowcharts disclosed in this document. For example, the processor(s) 202 may process information in the memory(s) 204 to generate third information/signals and then transmit wireless signals including the third information/signals through the transceiver(s) 206. The processor(s) 202 may receive wireless signals including fourth information/signals through the transceiver(s) 106 and then store information obtained by processing the fourth information/signals in the memory(s) 204. The memory(s) 204 may be connected to the processor(s) 202 and store various pieces of information related to operations of the processor(s) 202. For example, the memory(s) 204 may store software code including instructions for performing all or a part of processes controlled by the processor(s) 202 or for performing the descriptions, functions, procedures, proposals, methods, and/or operation flowcharts disclosed in this document. The processor(s) 202 and the memory(s) 204 may be a part of a communication modem/circuit/chip designed to implement RAT (e.g., LTE or NR). The transceiver(s) 206 may be connected to the processor(s) 202 and transmit and/or receive wireless signals through the one or more antennas 208. Each of the transceiver(s) 206 may include a transmitter and/or a receiver. The transceiver(s) 206 may be interchangeably used with RF unit(s). In the present disclosure, the wireless device may be a communication modem/circuit/chip.

Now, hardware elements of the wireless devices 100 and 200 will be described in greater detail. One or more protocol layers may be implemented by, not limited to, one or more processors 102 and 202. For example, the one or more processors 102 and 202 may implement one or more layers (e.g., functional layers such as physical (PHY), medium access control (MAC), radio link control (RLC), packet data convergence protocol (PDCP), RRC, and service data adaptation protocol (SDAP)). The one or more processors 102 and 202 may generate one or more protocol data units (PDUs) and/or one or more service data Units (SDUs) according to the descriptions, functions, procedures, proposals, methods, and/or operation flowcharts disclosed in this document. The one or more processors 102 and 202 may generate messages, control information, data, or information according to the descriptions, functions, procedures, proposals, methods, and/or operation flowcharts disclosed in this document and provide the messages, control information, data, or information to one or more transceivers 106 and 206. The one or more processors 102 and 202 may generate signals (e.g., baseband signals) including PDUs, SDUs, messages, control information, data, or information according to the descriptions, functions, procedures, proposals, methods, and/or operation flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operation flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. For example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, proposals, methods, and/or operation flowcharts disclosed in this document may be implemented using firmware or software, and the firmware or software may be configured to include the modules, procedures, or functions. Firmware or software configured to perform the descriptions, functions, procedures, proposals, methods, and/or operation flowcharts disclosed in this document may be included in the one or more processors 102 and 202 or may be stored in the one or more memories 104 and 204 and executed by the one or more processors 102 and 202. The descriptions, functions, procedures, proposals, methods, and/or operation flowcharts disclosed in this document may be implemented using firmware or software in the form of code, an instruction, and/or a set of instructions.

The one or more memories 104 and 204 may be connected to the one or more processors 102 and 202 and store various types of data, signals, messages, information, programs, code, instructions, and/or commands. The one or more memories 104 and 204 may be configured to include read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or wireless signals/channels, mentioned in the methods and/or operation flowcharts of this document, to one or more other devices. The one or more transceivers 106 and 206 may receive user data, control information, and/or wireless signals/channels, mentioned in the descriptions, functions, procedures, proposals, methods, and/or operation flowcharts disclosed in this document, from one or more other devices. For example, the one or more transceivers 106 and 206 may be connected to the one or more processors 102 and 202 and transmit and receive wireless signals. For example, the one or more processors 102 and 202 may perform control so that the one or more transceivers 106 and 206 may transmit user data, control information, or wireless signals to one or more other devices. The one or more processors 102 and 202 may perform control so that the one or more transceivers 106 and 206 may receive user data, control information, or wireless signals from one or more other devices. The one or more transceivers 106 and 206 may be connected to the one or more antennas 108 and 208 and the one or more transceivers 106 and 206 may be configured to transmit and receive user data, control information, and/or wireless signals/channels, mentioned in the descriptions, functions, procedures, proposals, methods, and/or operation flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received wireless signals/channels from RF band signals into baseband signals in order to process received user data, control information, and wireless signals/channels using the one or more processors 102 and 202. The one or more transceivers 106 and 206 may convert the user data, control information, and wireless signals/channels processed using the one or more processors 102 and 202 from the baseband signals into the RF band signals. To this end, the one or more transceivers 106 and 206 may include (analog) oscillators and/or filters.

Figure 20:
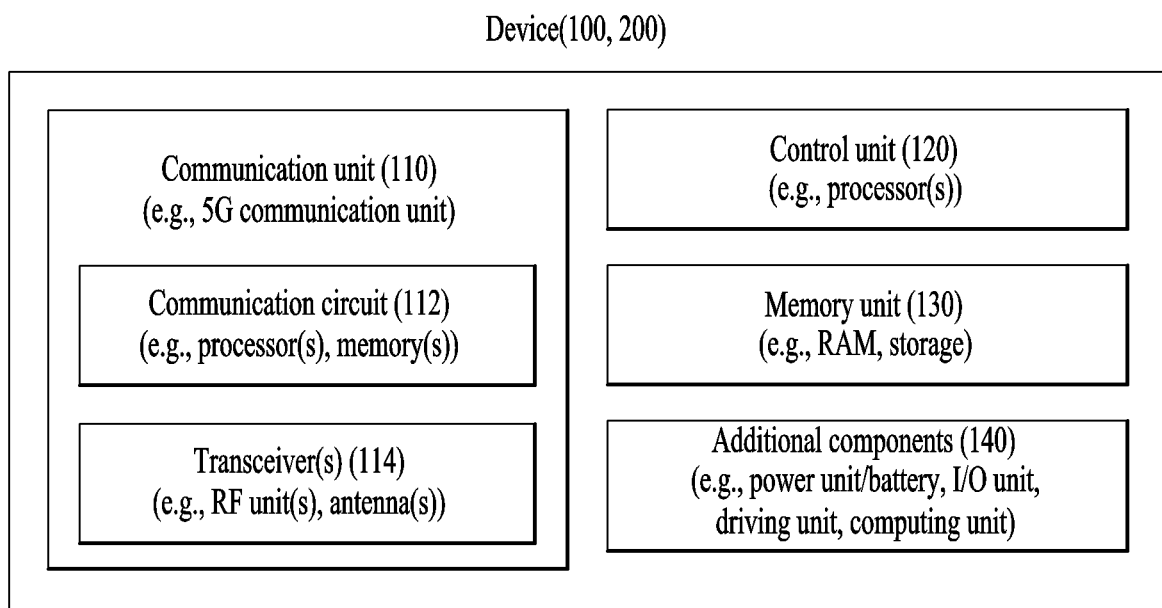

FIG. 20 illustrates another example of a wireless device applied to the present disclosure. The wireless device may be implemented in various forms according to a use case/service (refer to FIG. 18).

Referring to FIG. 20, wireless devices 100 and 200 may correspond to the wireless devices 100 and 200 of FIG. 19 and may be configured to include various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 and/or the one or more memories 104 and 204 of FIG. 19. For example, the transceiver(s) 114 may include the one or more transceivers 106 and 206 and/or the one or more antennas 108 and 208 of FIG. 19. The control unit 120 is electrically connected to the communication unit 110, the memory 130, and the additional components 140 and provides overall control to the wireless device. For example, the control unit 120 may control an electric/mechanical operation of the wireless device based on programs/code/instructions/information stored in the memory unit 130. The control unit 120 may transmit the information stored in the memory unit 130 to the outside (e.g., other communication devices) via the communication unit 110 through a wireless/wired interface or store, in the memory unit 130, information received through the wireless/wired interface from the outside (e.g., other communication devices) via the communication unit 110.

The additional components 140 may be configured in various manners according to type of the wireless device. For example, the additional components 140 may include at least one of a power unit/battery, input/output (I/O) unit, a driving unit, and a computing unit. The wireless device may be implemented in the form of, not limited to, the robot (100*a* of FIG. 18), the vehicles (100*b*-1 and 100*b*-2 of FIG. 18), the XR device (100*c* of FIG. 18), the hand-held device (100*d* of FIG. 18), the home appliance (100*e* of FIG. 18), the IoT device (100*f* of FIG. 18), a digital broadcasting terminal, a hologram device, a public safety device, an MTC device, a medical device, a FinTech device (or a finance device), a security device, a climate/environment device, the AI server/device (400 of FIG. 18), the BSs (200 of FIG. 18), a network node, or the like. The wireless device may be mobile or fixed according to a use case/service.

In FIG. 20, all of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module in the wireless devices 100 and 200 may further include one or more elements. For example, the control unit 120 may be configured with a set of one or more processors. For example, the control unit 120 may be configured with a set of a communication control processor, an application processor, an electronic control unit (ECU), a graphical processing unit, and a memory control processor. In another example, the memory 130 may be configured with a RAM, a dynamic RAM (DRAM), a ROM, a flash memory, a volatile memory, a non-volatile memory, and/or a combination thereof.

Figure 21:
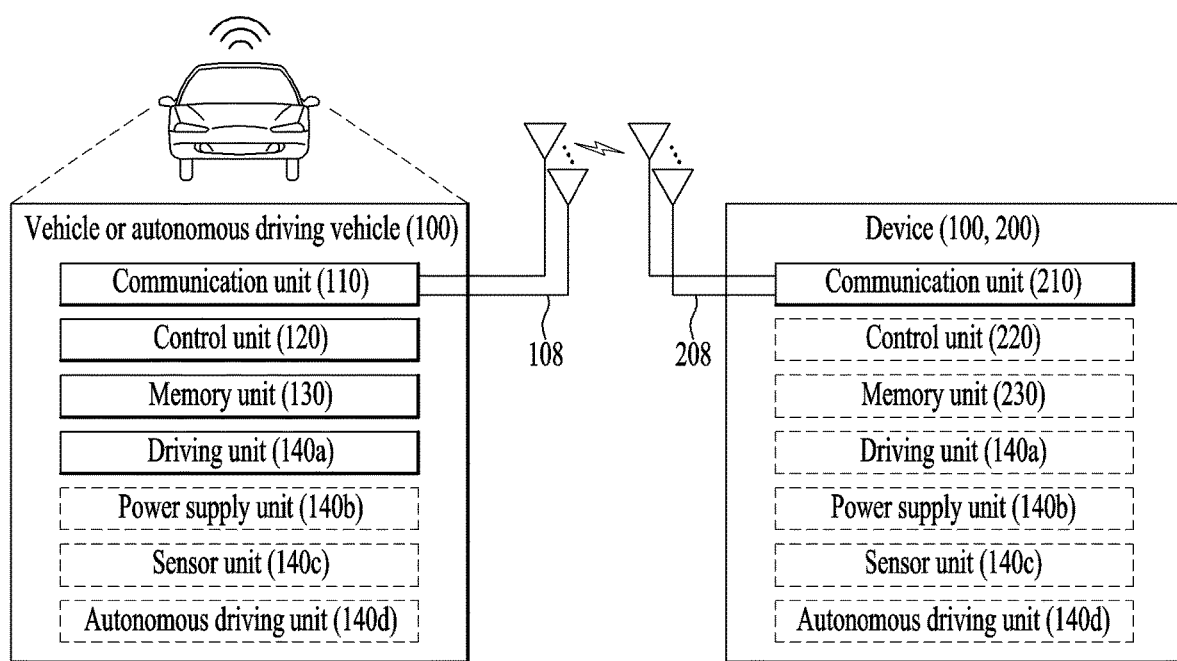

FIG. 21 illustrates a vehicle or an autonomous driving vehicle applied to the present disclosure. The vehicle or autonomous driving vehicle may be implemented as a mobile robot, a car, a train, a manned/unmanned aerial vehicle (AV), a ship, or the like.

Referring to FIG. 21, a vehicle or autonomous driving vehicle 100 may include an antenna unit 108, a communication unit 110, a control unit 120, a driving unit 140*a*, a power supply unit 140*b*, a sensor unit 140*c*, and an autonomous driving unit 140*d*. The antenna unit 108 may be configured as a part of the communication unit 110. The blocks 110/130/140*a* to 140*d* correspond to the blocks 110/130/140 of FIG. 20, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an ECU. The driving unit 140*a* may enable the vehicle or the autonomous driving vehicle 100 to drive on a road. The driving unit 140*a* may include an engine, a motor, a powertrain, a wheel, a brake, a steering device, and so on. The power supply unit 140*b* may supply power to the vehicle or the autonomous driving vehicle 100 and include a wired/wireless charging circuit, a battery, and so on. The sensor unit 140*c* may acquire information about a vehicle state, ambient environment information, user information, and so on. The sensor unit 140*c* may include an inertial measurement unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, and so on. The autonomous driving unit 140*d* may implement technology for maintaining a lane on which the vehicle is driving, technology for automatically adjusting speed, such as adaptive cruise control, technology for autonomously driving along a determined path, technology for driving by automatically setting a route if a destination is set, and the like.

For example, the communication unit 110 may receive map data, traffic information data, and so on from an external server. The autonomous driving unit 140*d* may generate an autonomous driving route and a driving plan from the obtained data. The control unit 120 may control the driving unit 140*a* such that the vehicle or autonomous driving vehicle 100 may move along the autonomous driving route according to the driving plan (e.g., speed/direction control). During autonomous driving, the communication unit 110 may aperiodically/periodically acquire recent traffic information data from the external server and acquire surrounding traffic information data from neighboring vehicles. During autonomous driving, the sensor unit 140*c* may obtain information about a vehicle state and/or surrounding environment information. The autonomous driving unit 140*d* may update the autonomous driving route and the driving plan based on the newly obtained data/information. The communication unit 110 may transfer information about a vehicle position, the autonomous driving route, and/or the driving plan to the external server. The external server may predict traffic information data using AI technology based on the information collected from vehicles or autonomous driving vehicles and provide the predicted traffic information data to the vehicles or the autonomous driving vehicles.

The embodiments of the present disclosure described above are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present disclosure or included as a new claim by a subsequent amendment after the application is filed.

The embodiments of the present disclosure have been described above, focusing on the signal transmission and reception relationship between a UE and a BS. The signal transmission and reception relationship is extended to signal transmission and reception between a UE and a relay or between a BS and a relay in the same manner or a similar manner. A specific operation described as performed by a BS may be performed by an upper node of the BS. Namely, it is apparent that, in a network comprised of a plurality of network nodes including a BS, various operations performed for communication with a UE may be performed by the BS, or network nodes other than the BS. The term BS may be replaced with the term fixed station, Node B, enhanced Node B (eNode B or eNB), access point, and so on. Further, the term UE may be replaced with the term terminal, mobile station (MS), mobile subscriber station (MSS), and so on.

The embodiments of the present disclosure may be achieved by various means, for example, hardware, firmware, software, or a combination thereof. In a hardware configuration, the methods according to the embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present disclosure may be implemented in the form of a module, a procedure, a function, etc. For example, software code may be stored in a memory unit and executed by a processor. The memory unit is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

The present disclosure may be used for a UE, a BS, or other equipment in a wireless mobile communication system.

What is claimed is:

1. A method of receiving an uplink transmission by a base station (BS) in a wireless communication system, the method comprising:
    transmitting resource allocation (RA) information for a physical uplink shared channel (PUSCH) transmission in a frequency band, wherein
        the frequency band includes resource block (RB) sets, each RB set including consecutive resource blocks (RBs),
        a guard band (GB) is included between the RB sets; and
    receiving the PUSCH transmission based on resource allocation in the frequency band based on the RA information,
    wherein based on the RA information indicating only one RB set, the resource allocation is determined as an intersection of RBs of one or more interlaces and the indicated one RB set, and
    wherein based on the RA information indicating RB sets, the resource allocation is determined as an intersection of RBs of one or more interlaces and union of the indicated RB sets and at least one GB between the indicated RB sets.

2. The method according to claim 1, wherein the at least one GB is at least one intra-cell GB.

3. The method according to claim 1, wherein each GB includes at least one consecutive RB.

4. The method according to claim 1, wherein each of the one or more interlaces includes RB groups (RBGs) spaced from each other by an equal distance in the frequency band, and each RBG includes at least one consecutive RB.

5. The method according to claim 1, wherein the frequency band includes an unlicensed band.

6. The method according to claim 1, wherein the RA information is received on a physical downlink shared channel (PDCCH).

7. A base station (BS) used in a wireless communication system, the BS comprising:
    at least one processor; and
    at least one computer memory operatively coupled to the at least one processor and when executed, causing the at least one processor to perform an operation,
    wherein the operation includes:
    transmitting resource allocation (RA) information for a physical uplink shared channel (PUSCH) transmission in a frequency band, wherein
        the frequency band includes resource block (RB) sets, each RB set including consecutive resource blocks (RBs),
        a guard band (GB) is included between the RB sets; and
    receiving the PUSCH transmission based on resource allocation in the frequency band based on the RA information,
    wherein based on the RA information indicating only one RB set, the resource allocation is determined as an intersection of RBs of one or more interlaces and the indicated RB set, and
    wherein based on the RA information indicating RB sets, the resource allocation is determined as an intersection of RBs of one or more interlaces and union of the indicated RB sets and at least one GB between the indicated RB sets.

8. The BS according to claim 7, wherein the at least one GB is at least one intra-cell GB.

9. The BS according to claim 7, wherein each GB includes at least one consecutive RB.

10. The BS according to claim 7, wherein each of the one or more interlaces includes RB groups (RBGs) spaced from each other by an equal distance in the frequency band, and each RBG includes at least one consecutive RB.

11. The BS according to claim 7, wherein the frequency band includes an unlicensed band.

12. The BS according to claim 7, wherein the RA information is received on a physical downlink shared channel (PDCCH).

13. An apparatus for a base station (BS), the apparatus comprising:
    at least one processor; and
    at least one computer memory operatively coupled to the at least one processor and when executed, causing the at least one processor to perform an operation,
    wherein the operation includes:
    transmitting resource allocation (RA) information for a physical uplink shared channel (PUSCH) transmission in a frequency band, wherein
        the frequency band includes resource block (RB) sets, each RB set including consecutive resource blocks (RBs), a guard band (GB) is included between the RB sets; and
receiving the PUSCH transmission based on resource allocation in the frequency band based on the RA information,
wherein based on the RA information indicating only one RB set, the resource allocation is determined as an intersection of RBs of one or more interlaces and the indicated on RB set, and
wherein based on the RA information indicating RB sets, the resource allocation is determined as an intersection of RBs of one or more interlaces in and union of the indicated RB sets and at least one GB between the indicated RB sets.

14. The apparatus according to claim 13, wherein the at least one GB is at least one intra-cell GB.

15. The apparatus according to claim 13, wherein each GB includes at least one consecutive RB.

16. The apparatus according to claim 13, wherein each of the one or more the interlaces includes RB groups (RBGs) spaced from each other by an equal distance in the frequency band, and each RBG includes at least one consecutive RB.

17. The apparatus according to claim 13, wherein the frequency band includes an unlicensed band.

18. The apparatus according to claim 13, wherein the RA information is received on a physical downlink shared channel (PDCCH).

* * * * *